US011029995B2

(12) United States Patent
Kogan et al.

(10) Patent No.: US 11,029,995 B2
(45) Date of Patent: Jun. 8, 2021

(54) HARDWARE TRANSACTIONAL MEMORY-ASSISTED FLAT COMBINING

(71) Applicant: Oracle International Corporation, Redwood City, CA (US)

(72) Inventors: Alex Kogan, Needham, MA (US); Yosef Lev, New York, NY (US)

(73) Assignee: Oracle International Corporation, Redwood City, CA (US)

( * ) Notice: Subject to any disclaimer, the term of this patent is extended or adjusted under 35 U.S.C. 154(b) by 914 days.

(21) Appl. No.: 15/154,686

(22) Filed: May 13, 2016

(65) Prior Publication Data
US 2016/0335117 A1  Nov. 17, 2016

Related U.S. Application Data

(60) Provisional application No. 62/161,784, filed on May 14, 2015.

(51) Int. Cl.
  *G06F 9/46*  (2006.01)
(52) U.S. Cl.
  CPC .................... *G06F 9/467* (2013.01)
(58) Field of Classification Search
  CPC ...................................... G06F 9/467
  USPC .................................. 718/101, 100
  See application file for complete search history.

(56) References Cited

U.S. PATENT DOCUMENTS

| | | | |
|---|---|---|---|
| 8,683,143 B2 | 3/2014 | Akkary et al. | |
| 8,694,706 B2* | 4/2014 | Dice | G06F 9/526 710/200 |
| 9,110,691 B2 | 8/2015 | Chung et al. | |
| 9,292,337 B2* | 3/2016 | Busaba | G06F 9/467 |
| 2001/0056420 A1* | 12/2001 | Steele, Jr. | G06F 9/52 |
| 2007/0143287 A1 | 6/2007 | Adl-Tabatabai et al. | |
| 2008/0148262 A1* | 6/2008 | Dice | G06F 9/3863 718/101 |

(Continued)

OTHER PUBLICATIONS

Vladimir Budovsky, "Combining Techniques Application for Tree Search Structures", Master's thesis, Tel Aviv University, 2010, pp. 1-34.

(Continued)

*Primary Examiner* — Bradley A Teets
(74) *Attorney, Agent, or Firm* — Robert C. Kowert; Kowert, Hood, Munyon, Rankin & Goetzel, P.C.

(57) ABSTRACT

An HTM-assisted Combining Framework (HCF) may enable multiple (combiner and non-combiner) threads to access a shared data structure concurrently using hardware transactional memory (HTM). As long as a combiner executes in a hardware transaction and ensures that the lock associated with the data structure is available, it may execute concurrently with other threads operating on the data structure. HCF may include attempting to apply operations to a concurrent data structure utilizing HTM and if the HTM attempt fails, utilizing flat combining within HTM transactions. Publication lists may be used to announce operations to be applied to a concurrent data structure. A combiner thread may select a subset of the operations in the publication list and attempt to apply the selected operations using HTM. If the thread fails in these HTM attempts, it may acquire a lock associated with the data structure and apply the selected operations without HTM.

18 Claims, 11 Drawing Sheets

(56) References Cited

U.S. PATENT DOCUMENTS

| | | | | |
|---|---|---|---|---|
| 2009/0172299 A1* | 7/2009 | Goodman | ............... | G06F 9/526 711/147 |
| 2010/0333096 A1* | 12/2010 | Dice | ....................... | G06F 9/467 718/102 |
| 2011/0119452 A1 | 5/2011 | Heller, Jr. | | |
| 2012/0310987 A1* | 12/2012 | Dragojevic | ............. | G06F 9/467 707/792 |
| 2012/0311606 A1* | 12/2012 | Marathe | ................... | G06F 9/526 718/107 |
| 2014/0282574 A1* | 9/2014 | Marathe | ................ | G06F 9/4881 718/103 |
| 2015/0169362 A1 | 6/2015 | Gottschlich et al. | | |

OTHER PUBLICATIONS

Danny Hendler, et al., "Scalable Flat-Combining Based Synchronous Queues", In Proceedings of the International Conference on Distributed Computing (DISC), 2010, pp. 79-93, Springer Berlin Heidelberg.

Danny Hendler, et al., "Flat Combining and the Synchronization-Parallelism Tradeoff", In Proceedings of the ACM Symposium on Parallelism in Algorithms and Architectures (SPAA), 2010, pp. 355-364.

Steve Heller, et al., "A Lazy Concurrent List-Based Set Algorithm", In Proceedings of the International Conference on Principles of Distributed Systems (OPODIS), 2005, pp. 3-16.

Dana Drachsler-Cohen, et al., "LCD: Local COmbining on Demand*", In Proceedings of the International Conference on Principles of Distributed Systems (OPODIS), 2014, pp. 355-371.

Yehuda Afek, et al., "Software-Improved Hardware Lock Elision", In ACM Symposium on Principles of Distributed Computing, PODC, 2014, pp. 212-221.

Richard M. Yoo, et al., "Performance Evaluation of Intel Transactional Synchronization Extensions for High-Performance Computing", In International Conference for High Performance Computing, Networking, Storage and Analysis (SC), IEEE, 2013, pp. 1-11.

Ravi Rajwar, et al., "Speculative Lock Elision: Enabling Highly Concurrent Multithreaded Execution", In Proceedings of the 34th Annual ACM/IEEE International Sym-posium on Microarchitecture, 2001, pp. 294-305.

Corbet, "Driver porting: mutual exclusion with seqlocks", Retrieved from URL: https://lwn.net/Articles/22818/, Posted Feb. 14, 2003, pp. 1-2.

* cited by examiner

HARDWARE TRANSACTIONAL MEMORY-ASSISTED FLAT COMBINING

This application claims benefit of priority of U.S. Provisional Application Ser. No. 62/161,784 titled "Efficient Synchronization Using Flat Combining and Hardware Transactional Memory," filed May 14, 2015, the content of which is incorporated by reference herein in its entirety.

BACKGROUND

1. Field of the Disclosure

This disclosure relates generally to concurrent data structures, and more particularly to systems and methods for synchronizing accesses to concurrent data structure by threads of a multithreaded application.

2. Description of the Related Art

Research on optimistic execution techniques was recently revitalized with the introduction of hardware transactional memory (HTM) features in multicore architectures. One such technique is transactional lock elision (TLE). Transactional lock elision (TLE) utilizes hardware transactional memory (HTM) to allow multiple critical sections (CS) associated with the same lock to execute concurrently, without requiring the programmer to modify the CS code. TLE has been shown to be extremely useful when used with data structures that provide high level of potential parallelism, such as skip lists or binary search trees. Other inherently sequential data structures, however, such as stacks or queues, do not benefit from optimistic execution techniques.

SUMMARY

Synchronization of accesses to, and/or operations on, concurrent data structures may utilize HTM-assisted Flat Combining (HAFC). A framework configured to implement HAFC, such as an HAFC framework, or HTM-assisted Combining Framework (HCF) may, in various embodiments, enable multiple (combiner and non-combiner) threads to access a shared data structure concurrently using HTM. For instance, as long as a combiner executes in a hardware transaction and tests that the global lock protecting the access to the data structure is not held, it may execute concurrently with other threads operating on the same data structure. The concepts, mechanisms and/or techniques described herein may include attempting to apply an operation to a concurrent data structure utilizing hardware transactional memory (e.g., using transactional lock elision within a hardware transaction) and then, if the HTM attempt(s) fails, utilizing flat combining within an HTM-based transaction to apply the operation.

HCF may support multiple publication lists that threads may use to announce their operations. Each thread accessing the data structure may first attempt to apply its operation using hardware transactions (without announcing its operation to other threads using a publication list). If these HTM-based attempts fail, the thread may announce its operation in a publication list and proceed with another set of attempts to apply its operation using HTM. If these attempts fail as well, the thread may attempt to become a combiner for the publication list used to announce its operation. As a combiner, the thread may select a subset of the pending operations in the publication list and may attempt to apply these selected operations using HTM, possibly combining and/or eliminating them. For instance, the combiner may combine two or more operations in order to apply them to the data structure more efficiently and may eliminate two or more operations if the results of those operations cancel each other (e.g., matching insert and remove operations). The selected subset may include only its operation, but may also include some or all other pending operations in the publication list. If the thread fails in these HTM attempts (e.g., prior to announcing its operation, after announcing its operation and as a combiner), it may then acquire a lock associated with the data structure and apply the selected operations without using HTM.

Thus HCF, as described herein, may combine TLE with FC and may be applicable to a wider range of data structures, as well as possibly outperforming, both FC and TLE in a wide range of workloads. In various embodiments, HCF-based synchronization techniques may be customized to various data structures. For instance, HCF may be customized to data structures that have one (or more) contention points (e.g., stacks or queues) that are inherently scalable (e.g., search trees) and/or any combination thereof (e.g., priority queues, where RemoveMin operations always conflict with each other while Insert operations typically do not conflict).

Figure 1:
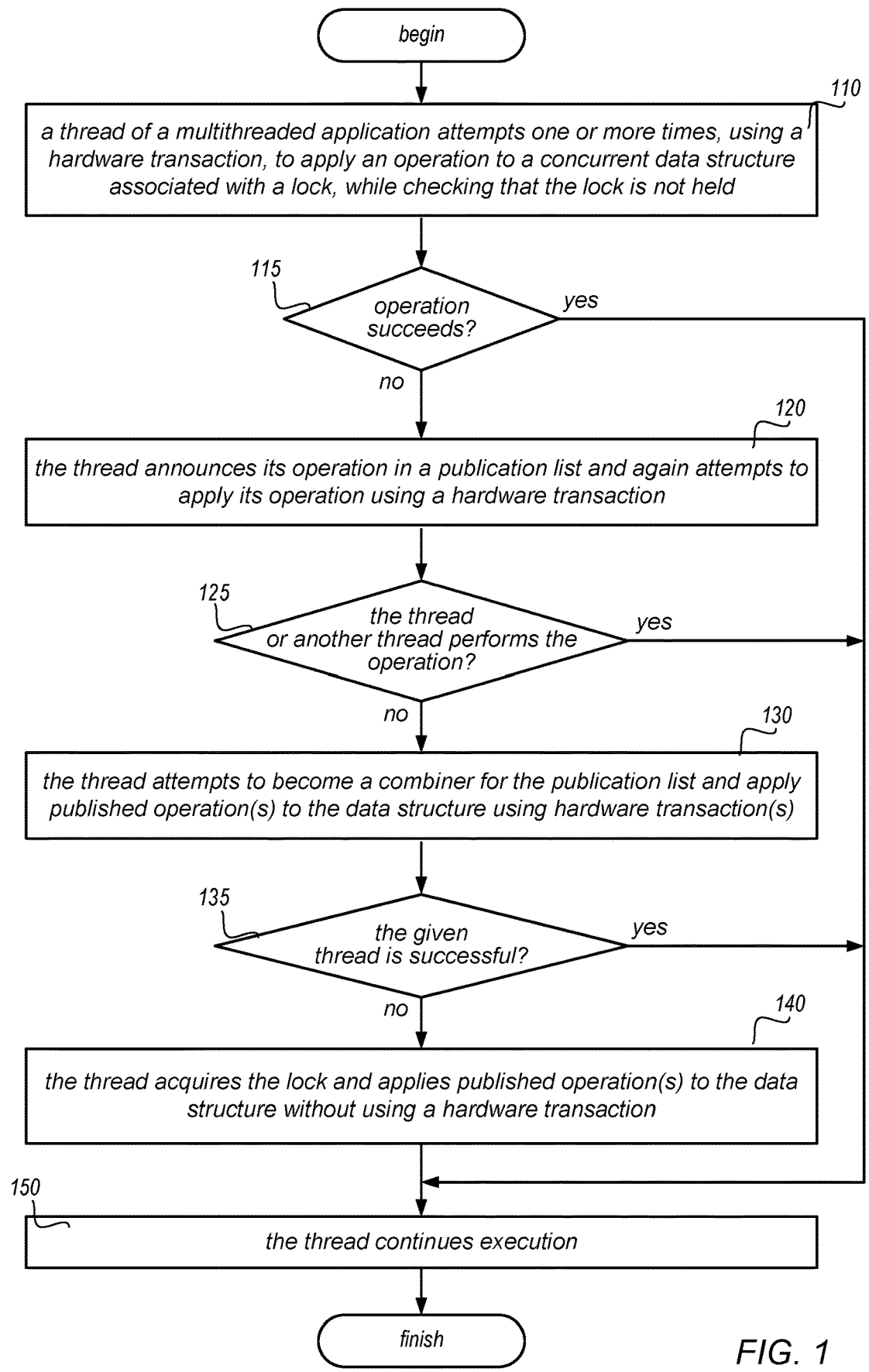
FIG. 1 is a flow diagram illustrating one embodiment of a method for implementing HCF to apply an operation to data structure, as described herein.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, TLE has been shown to be extremely useful when used with data structures that provide a high level of potential parallelism, such as skip lists or binary search trees. However, other inherently sequential data structures, however, such as stacks or queues, do not benefit from optimistic execution techniques. These data structures may perform better with techniques that allow efficient serialization of multiple threads, such as that provided by the flat combining (FC) algorithm. With FC, the thread that is holding the lock (i.e., the combiner) may execute operations on behalf of threads that are waiting for the lock, hence potentially reducing the number of lock transitions and the amount of coherence traffic.

In many cases, though, the benefits of FC may be desired along with the flexibility of enabling concurrent execution of operations by multiple threads. In some embodiments of the systems described herein, synchronization of accesses to, and/or operations, on concurrent data structures may implement an HTM-assisted combining framework (HCF) employing a combination of FC and TLE. In various embodiments, HCF may leverage HTM to allow multiple combiners to run concurrently with each other, as well as with other, non-combiner threads. As with TLE and FC, HCF may require only minimal changes to the sequential code, and may not require the programmer to include any concurrency-specific code. Additionally, a HCF framework may be, and/or may include, various methods, functions, classes, etc., configured to implement the concepts, mechanisms and/or techniques described herein as part of HCF.

As described herein, an HCF framework may be applied to various data structures, including skip-lists-based priority queue and AVL-tree-based set. According to some embodiment, HCF implementations may outperform FC and TLE alternatives on a variety of workloads.

In various embodiments, the systems described herein may combine the benefits of flat combining and hardware transactional memory thereby providing a synchronization technique usable for design of scalable concurrent data structures with minimal (or no) changes to their sequential implementations. These techniques may be applicable to any software that uses concurrent data structures, according to various embodiments.

The HCF framework described herein may result in a new synchronization technique by combining TLE and FC. The synchronization technique described herein may be applicable to a wider range of data structures and may outperform both FC and TLE in a wide range of workloads. The synchronization techniques described herein may be considered flexible and customizable to various data structures, including those that have one (or more) contention points (e.g., stacks or queues), that are inherently scalable (e.g., search trees) and/or combinations thereof. For example, in one embodiment, the HCF framework described herein may be customizable to priority queues, such as those where RemoveMin operations may conflict with each other while Insert operations may not. An initial evaluation shows that the new technique outperforms both TLE and FC in a range of data structures and workloads, according to some embodiments.

While the embodiments described herein in the detailed description and examples reflect distinct groups of features, these groupings of features are abstractions for the purpose of clarifying some features by elision from view of others that would be practiced in conjunction, and one of skill in the art will readily ascertain in light of having read the present specification that combinations of features different from the particular combinations described herein are contemplated within the scope and intent of this disclosure. Thus, features from different parts of this disclosure and its appendices may be combined without departing from the scope and intent of this disclosure, and one of skill in the art will readily comprehend in light of this disclosure that different elements of the disclosure and its appendices may be combined in ways not clarified herein to preserve the clarity of discussion of the features themselves.

Additionally, some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

INTRODUCTION

Optimistic synchronization techniques, as used herein, may be considered synchronization techniques that allow multiple threads to execute their critical sections (CS) concurrently as long as they do not conflict on any shared data access, and that roll back any changes to data if a conflict occurs. Such optimistic execution may be supported in software, such as by using software transactional memory (STM) or a sequence lock, or in hardware, such as by using hardware transactional memory (HTM). The introduction of HTM features in recent multicore processors popularized one particular technique for supporting optimistic execution using HTM, namely transactional lock elision (TLE). TLE may use HTM to speculatively run multiple critical sections in parallel in different threads. Logically the critical sections may be serialized by a single lock, but as long as their implementations touch disjoint sets of data, HTM may allow them to run and commit in parallel. For example, in TLE, a thread starts a hardware transaction and may attempt to execute a CS protected by a lock after confirming that the lock is not held by another thread. If this attempt fails, the thread may either retry using another (hardware) transaction or may revert to acquiring the lock. A key property of the TLE technique is that it does not require the programmer to change the code of the CS. In other words, TLE may be implemented separately from, while being applied to, the programmer's code. Along with that, TLE may provide the same level of parallelism achieved by fine grained synchronization, even in programs that use a single lock to protect a sequential implementation of a data structure, according to some embodiments.

However, optimistic execution techniques may only be useful when a data structure enables some level of parallel access. Some data structures, such as stacks, are inherently sequential—that is, any pair of accesses to the data structure may necessarily conflict with each other. For these data structures, techniques that efficiently serialize the access are likely to be more beneficial than techniques that don't efficiently serialize access to the data structure. One such technique, called flat combining (FC), was recently introduced by Handler, et al. FC enables combination and/or elimination optimizations, which may allow multiple operations to cancel each other or be combined into one, more efficient operation, thus potentially reducing the total work under lock. FC may use a global lock to protect access to a shared data structure while providing a set of published operations, such as a publication list or publication array, usable by concurrent threads to announce operations they intend to apply to the shared data structure. For example, a thread T1 announces its operation and attempts to become a combiner, that is, it acquires the lock and may then apply its operation along with all operations announced by other threads, possibly combining and eliminating some of those operations. If the lock acquisition fails, T1 may realize that another thread T2 is running as a combiner, and thus may wait for its operation to be completed by T2, or for the lock to become available again (e.g., so that it can apply the operation).

FC techniques may feature several important properties. FC may enhance cache performance since the lines holding the lock and the data structure may not need to be transferred within the machine. FC may reduce the coherence traffic due to cache invalidation, such as by reducing the number of lock transitions between threads and by having each thread apply multiple operations on the data structure. Additionally, as noted above, FC techniques may enable various optimizations, such as combination and/or elimination optimizations, potentially reducing the number of accesses to the data structure, the total amount of work, and/or the time under the lock (e.g., the amount of time the lock is held), according to various embodiments. As with TLE techniques, FC techniques may be implemented using simple sequential code, without burdening the programmer with concurrency concerns. Additionally, since all pending operations may be executed by one combiner, FC may only be efficient for inherently sequential data structures that support aggressive combining and elimination of concurrent operations.

In many cases, the benefits of FC may be desired along with the flexibility of enabling concurrent execution of operations by multiple threads. The HCF framework described herein may, in various embodiments, enable multiple (combiner and non-combiner) threads to access the data structure concurrently using HTM. According to some embodiments, as long as a combiner executes in a hardware transaction while the global lock protecting the access to the data structure is not held, it can execute concurrently with other threads operating on the same data structure. Thus, the HCF framework described herein may enable a whole new set of design approaches, such as allowing multiple combiners to run concurrently or allowing selective combining (e.g., where the combiner may decide to apply only some pending operations, while other, non-selected operations can be executed concurrently by threads that invoked them).

In various embodiments, HCF may support multiple sets of published operations (e.g., publication lists or arrays) usable by threads to announce their operations. In some embodiments, the number of publication lists, as well as the manner in which a thread chooses which list to use for each announcement, may depend on the actual data structure. The HCF techniques described herein may involve multiple attempts by a thread to apply one or more operations to a shared data structure. Each of these attempts may be logically described as taking part in a different phase of the HCF technique being used. As descried in more detail below, each thread accessing the data structure may go through up to four logical phases while attempting to apply an operation to shared data structure, according to some embodiments. For example, a thread may first attempt to apply its operation to the shared data structure using hardware transactions, without announcing its operation to other threads. If these attempts fail, the thread may then announce its operation in a set of published operations (e.g., a publication list) for the data structure and proceed with another set of attempts to apply its operation using HTM (e.g., using hardware transactions). If these attempts fail as well, the thread may attempt to become a combiner for the publication list (e.g., the publication list the thread used to announce its operation). As a combiner, the thread may select a subset of pending operations in the publication list and may attempt to apply these selected operations using HTM while possibly combining and/or eliminating some of the operations. The subset of operations the thread selects from the publication list may include only the operation that the thread needs to apply (e.g., the operation that it announced), but it may also include one or more (or all) other operations in the publication list (e.g., operations announced by other threads). If the thread fails in these HTM attempts, it may then acquire the global lock associated with the data structure and apply the selected operations without using HTM.

Thus, HCF may provide several points of customization and tuning for a given data structure, according to various embodiments. While some of these customizations may require a programmer to write additional (possibly trivial) data-structure-dependent code (e.g., for choosing how many combiners/publication lists to use and/or how to assign operations to combiners) these decisions may only affect the performance (i.e. not the correctness) of the resulting concurrent algorithm. As described in more detail below, HCF may, in various embodiments, guarantee that all operations applied to the data structure, whether applied by the invoking threads or by a combiner, are executed exactly once. For instance, HCF may guarantee that all operations are executed exactly one either by a thread holding the lock associated with the data structure or by a hardware transaction while the lock is not held (e.g., by a hardware transaction that tests that this lock is not held). Thus, when implementing HCF, all operations may appear to be applied atomically, regardless of how many combiners are used, and regardless of the particular manner in which operations are divided among, and selected by, multiple combiners. Thus, according to some embodiments, HCF may allow the particular programming model to be considered safe and simple while preserving features of both TLE and FC. HCF, as described herein may involve the following properties, according to some embodiments:

- Allowing multiple combiners to run operations in parallel, without requiring the programmer to reason about concurrency. In particular, the programmer may only have to reason about execution under a single global lock.
- Combine on demand, i.e., allowing an operation to run in parallel without being combined until it decides to register for combining.
- Allowing customization of the way operations are associated with their potential combiners, effectively introducing contention control between conflicting operations. Thus, when a thread becomes a combiner (typically, only after trying to apply its operation optimistically using HTM), it may only delay threads with which it actually conflicts, allowing other, non-conflicting threads to proceed concurrently.
- The way operations are associated with their potential combiners affects only performance but not correctness. As a result, this association (as well as the number of combiners) can be changed dynamically, such as based on the current levels of contention.

Furthermore, according to various embodiments, the flexibility of the HCF framework may be beneficial in different ways to various data structures and workloads. In particular:

- In some cases, it may be desirable to apply features of both TLE and FC for different operations in the same data structure. For example, all invocations of RemoveMin operations for a skip-lists-based priority queue may necessarily conflict with each other, while invocations of Insert operations can often run in parallel. In one example embodiment, HCF may be customized to combine the RemoveMin operations (e.g., using a FC approach) while concurrently executing Insert operations (e.g., using a TLE-like approach).
- For some data structures with a low level of inherent parallelism, an HCF framework may, in some embodiments, use multiple instances of an FC algorithm concurrently on operations that are unlikely to conflict. Consider, for example, a data structure like a double-ended-queue, where all operations on a particular end of the queue conflict with each other (and may be combined), but operations on different ends are unlikely to conflict or to be efficiently combined (unless the queue is empty). Thus in some embodiments, an HCF framework may be customized to use two publication lists and two combiners (e.g., one for each end of the queue). Note that, in this example, no additional effort may be required to synchronize between multiple combiners and/or to handle the special case of the empty queue correctly.
- Even for data structures that provide a reasonable level of parallelism and thus may benefit from a TLE-based technique, HCF may be used for better contention control and memory access efficiency. For example, a HCF framework may be customized to use multiple publication lists with a balanced search tree. For instance, the HCF framework may use a separate publication list per disjointed subtree (e.g., left and right subtrees of the root node) since the chance for operations on different subtrees to conflict may be relatively low. If a thread becomes a combiner for one subtree, other threads applying operations to different subtrees may proceed concurrently using HTM, according to some embodiments. Another example is one in which the parallelism is, or should be, restricted due to limited hardware resources (e.g., by using one combiner per core/socket to combine operations of all threads that share the same core/socket or cache bank). In this case, the exact manner in which operations may be split between combiners may be data structure independent, and may also be performed without the programmer involvement (e.g., by the HCF framework behind the scene).
- In some embodiments, it may be possible to improve TLE by using FC as a fallback option. For example, if multiple threads fail when attempting to execute their respective operations using HTM and are therefore all requiring the lock, FC may be used to combine these operations and reduce the total time under lock and the number of lock transitions (e.g., because a single combiner thread may perform multiple operations).

A prototype implementation of an HCF framework, as described herein, has been developed and experiments with several data structures have demonstrated some of the benefits of HCF described herein. In particular, a concurrent skip-lists-based priority queue and an AVL tree-based set using the HCF framework have been developed and evaluated. The evaluations show that these implementations outperform FC and TLE alternatives on a variety of workloads, according to some embodiments.

Related Work

In some implementations, the FC technique uses one global lock to protect access to a shared data structure. This feature may facilitate the design of concurrent data structures that use FC, and may work well when the data structure has few (or a single) hot spots. However, the use of a single lock may harm scalability for data structures allowing concurrent access.

Several papers have considered extending the FC technique to support multiple combiners. For example, Hendler et al. present the design of concurrent synchronous queues using a parallel flat combining algorithm. The idea is to split dynamically the publication array into chunks, where each chunk can be processed in parallel by a different combiner. Each combiner matches pending requests in its chunk, and uses additional exchange single-combiner synchronous queue to store an overflow of operations of the same type that did not have a matching pair. Applying this approach to other data structures remains an open question. Furthermore, it is not clear if the parallel flat combining algorithm gives any benefit when operations of a data structure do not eliminate each other. This is because it still allows only one thread (i.e., the combiner of the exchange queue) to access the data structure.

Budovsky attempts to use multiple combiners for designing skip-lists-based sets. His idea is to divide the skip-list statically into multiple non-intersecting regions, where requests belonging to each region are managed by a different combiner. The margins of each region are identified by specially marked nodes of the skip-list; these nodes are assumed to be immutable. Even with these limiting assumptions the resulting implementation does not exploit the amount of parallelism provided by skip-lists as it is outperformed by other (lock-free and fine-grained locks-based) alternatives for many workloads.

Recent work considers applying combining to lazy linked lists, where threads traverse list nodes in a lock-free fashion, and acquire a per-node lock if they need to update that node. Drachsler-Cohen and Petrank modify locks used to protect list nodes so that a thread acquiring the lock may combine its operation with those of other threads waiting for the same lock. This technique inherently relies on the existence of a scalable concurrent implementation that uses locks, and thus (conversely to FC, TLE and HCF) is not applicable to sequentially implemented data structures.

Various features of TLE may provide nearly linear scalability when concurrently running threads do no conflict, but its performance may deteriorate when such conflicts do occur or when capacity limits are reached. Several recent papers suggest ways to enhance TLE to cope better with these limitations. Afek et al., for instance, proposed to use an auxiliary lock to synchronize between threads that fail because of data contention. Diegues et al. introduced core locks, which synchronize between threads running on the same core when transactions fail due to capacity limits. However, none of the previous work considers combining operations of concurrent threads, e.g., those that have conflicts or share the same core/socket, as described herein.

The HCF Framework

The following section describes various embodiments of an HCF framework.

Overview

With HCF, given a sequential implementation data-structure protected by a lock, an operation invoked by a thread T, denoted as the operation's owner, goes through multiple logical phases until completion. For example, according to some embodiments, when implementing HCF, a thread may utilize (up to, and at most) four logical phases when attempting to perform an operation on a shared data-structure. Put another way, an operation being performed on the data structure may go through (up to, and at most) four logical phases until completion. Each logical phase may be considered a different technique in which the thread invoking the operation (e.g., the operation's owner) attempts to apply the operation to the data structure.

FIG. 1 is a flow diagram illustrating one embodiment of a method for implementing HCF to apply an operation to data structure, as described herein. When implementing HCF, a multithreaded application may include multiple thread that each needs to access a concurrent data structure that is associated with a lock. As noted above, when attempting to apply an operation to a concurrent data structure, the thread (and/or the operation) may be considered to go through different logical phases. For example, one logical phase may be termed an OwnerPreAnnounce phase, in which, according to various embodiments, the owner thread tries, perhaps multiple times, to execute the operation using a hardware (HW) transaction before the operation is put in a publication list (e.g., a publication list) and becomes visible to combiners. Thus, as shown in block 110, a thread of a multithreaded application may attempt one or more times, using a hardware transaction, to apply an operation to a concurrent data structure that is associated with a lock, while checking that the lock is not held. Thus, in some embodiments, the OwnerPreAnnounce logical phase may include multiple attempts to apply the operation using a hardware transaction, as long as the lock is not held (e.g., by another thread).

If the operation is not successfully applied to the concurrent data structure during the logical OwnerPreAnnounce phase, as indicated by the negative output of decision block 115, the thread may then attempt to execute the operation (e.g., apply the operation to the concurrent data structure) using a hardware transaction after announcing the operation by adding it to a publication list associated with the concurrent data structure, which may be termed a OwnerPostAnnounce logical phase. Thus, as illustrated in block 120, the thread may announce its operation in a publication list and again attempt to apply its operation using a hardware transaction. In some embodiments, the OwnerPostAnnounce logical phase may include multiple attempts to apply the (now published) operation using a hardware transaction. In some embodiments, when an operation is tried in the OwnerPostAnnounce logical phase, it may be completed either by the owner or by another thread (e.g., that is in the CombinerHTM or CombinerLock logical phases, described below).

As noted above, in some embodiments, one or more publications lists may be associated with a concurrent data structure and a thread may, as part of a CombinerHTM logical phase, become a combiner in order to perform (e.g., apply) published operations (while possibly combining and/or eliminating some of the operations according to one or more FC techniques). If, as indicated by the negative output of decision block 125, neither the thread publishing the operation, nor any other thread, succeeds in performing the operation (e.g., applying the operation to the concurrent data structure), the thread may then attempt to become a combiner for the publication list and apply one or more published operation(s) to the data structure using one or more hardware transactions, as shown in block 130. For instance, a thread may execute a subset (including one, some or all) of the announced operations on the publication list, including its own operation, using one or more hardware transactions. For example, a thread may execute (e.g., apply) each operation in its own, respective, hardware transaction. Alternatively, thread may retry the same operation using multiple hardware transactions upon failure (e.g., one hardware transaction for each attempt). In general, a thread may determine how many operations to attempt to apply in a single hardware transaction. When combining two or more operations into a single, more efficient, operation, the resulting combined operation may be executed within one successful hardware transaction. Thus, in some embodiments, in order to be considered a combined operation, the combined operations may be required to be applied using a single, successful hardware transaction.

As described in more detail below, a CombinerHTM logical phase may include, according to some embodiments, various data-structure specific optimizations, such as elimination and/or combination optimizations. For example, a combiner thread may execute several operations together (possibly as a single combined operation) in a more efficient manner than would be achieved executing them sequentially, one after the other. Additionally, a combiner thread may adjust the number of operations executed in each hardware transaction, according to some embodiments.

If, as indicated by the negative output of decision block 135, the thread is not successful at becoming a combiner and/or applying (at least its own) published operation(s) to the concurrent data structure, the thread may then acquire the lock associated with the data structure and apply the published operation(s) to the data structure without using a hardware transaction, as shown in block 140 and according to some embodiments. For example, in a CombinerLock logical phase, a thread may, after obtaining a lock associated with the data structure, apply a subset of the published operations (possibly including its own published operation), while holding the data structure lock, without using hardware transactions. Additionally, while FIG. 1 illustrates an embodiment in which a thread does not apply any operations while holding the lock if it had successfully applied one or more operations (e.g., its own published operation) using a hardware transaction, in other embodiments, a thread may apply one or more operations using a hardware transaction and also apply one or more operations while holding the lock (e.g., without a hardware transaction). Thus, in some embodiments, a thread may be able to execute one or more operations as a combiner using a hardware transaction in a CombinerHTM logical phase, as described above regarding block 130, and apply one or more other operations (e.g., of the same publication list) under the lock (e.g., while holding the lock) in a CombinerLock logical phase. For example, a thread may apply one or operations from a selected subset of a publication list using one or more hardware transactions and then apply the remainder of the operations from the selected subset while holding the lock (e.g., without using hardware transactions). In one embodiment, a thread may acquire the lock to apply those operations that it failed to apply using hardware transaction.

After the thread's operation is successfully applied to the data structure, regardless of how (e.g., in which logical phase), the operation may be considered complete and the thread may continue execution, as shown in block 150. While illustrated as being performed in particular order and in a particular manner, the concepts, techniques and/or mechanisms described above regarding FIG. 1, may be implemented differently in different embodiments. Additionally, actions described as being performed by a thread may be implemented by one or more functions and/or methods of a HCF framework.

Below is a summary of four logical phases through which a thread implementing HCF may attempt to apply an operation to a concurrent data structure, according to various embodiments:

A. OwnerPreAnnounce: the owner may try, perhaps several times, to execute the operation using a hardware (HW) transaction before the operation is announced (e.g., put in a publication list) and becomes visible to combiners.

B. OwnerPostAnnounce: like in the OwnerPreAnnounce logical phase, the owner may try, perhaps several times, to execute the operation using one or more HW transactions, but only after announcing the operation (e.g., by adding it to a publication list). Additionally, as noted above, when an operation is tried in the OwnerPostAnnounce logical phase, it may be completed either by the owner or by another thread (e.g., that is in the CombinerHTM or CombinerLock logical phases).

C. CombinerHTM: the owner thread that has become a combiner for a publication list may execute a subset of the announced (published) operations, including its own, using one or more HW transactions. Additionally, various kinds of data-structure specific elimination and/or combination optimizations may be implemented.

D. CombinerLock: as with the Combiner HTM logical phase, the thread may execute a subset of the announced operations while holding the data-structure lock, without using HW transactions.

Please note that the logical phases outlined above represent merely one possible organization of the features, concepts, mechanisms and/or techniques described herein as part of HCF and are used for descriptive purposes only, and do not necessarily represent any actual division of code, methods and/or entities implementing HCF. In general, the features, concepts, mechanisms and/or techniques described herein as part of HCF may be implemented, organized, and/or described differently in different embodiments.

In some embodiments, a generic HCF framework, as described herein, may try to execute an operation by iterating through each of the logical phases, as described above, one after another, until one of the phases successfully completes it. This is illustrated by the example pseudocode below. In the pseudocode below, Op may be considered a descriptor that describes an operation to be applied and that can hold a result (e.g., a return value), if any, from executing (e.g., applying) the operation.

```
Execute(Op) {
    // Choose the publication array that Op is associated with
    Pa = choosePubArr(Op); // The publication array Op is associated with
    if ( !tryPreAnnounce(Op,Pa) &&
         !tryPostAnnounce(Op,Pa) &&
         !tryCombineHTM(Op,Pa) ) {
        combineUnderLock(Op);
    }
    return Op.retVal;
}
```

Note that when an operation is tried during the OwnerPostAnnounce logical phase, it may be completed either by the owner thread, or by another thread that is in the CombinerHTM or CombinerLock logical phases; in both cases, the tryPostAnnounce function in the above pseudocode may return true, and the owner may not perform the CombinerHTM or CombinerLock logical phases. As the next section describes, to guarantee that each operation is executed successfully exactly (and only) once (e.g., in only one of the logical phases), a HCF framework may, in some embodiments, maintain additional state information per operation that may be used to synchronize between different threads and/or the different logical phases. Additionally, in some embodiments a thread may execute (e.g., apply) operations in more than one logical phase. For instance, a thread may execute one or more operations within a CombinerHTM logical phase and may also execute one or more operations within a CombinerLock logical phase.

Figure 2:
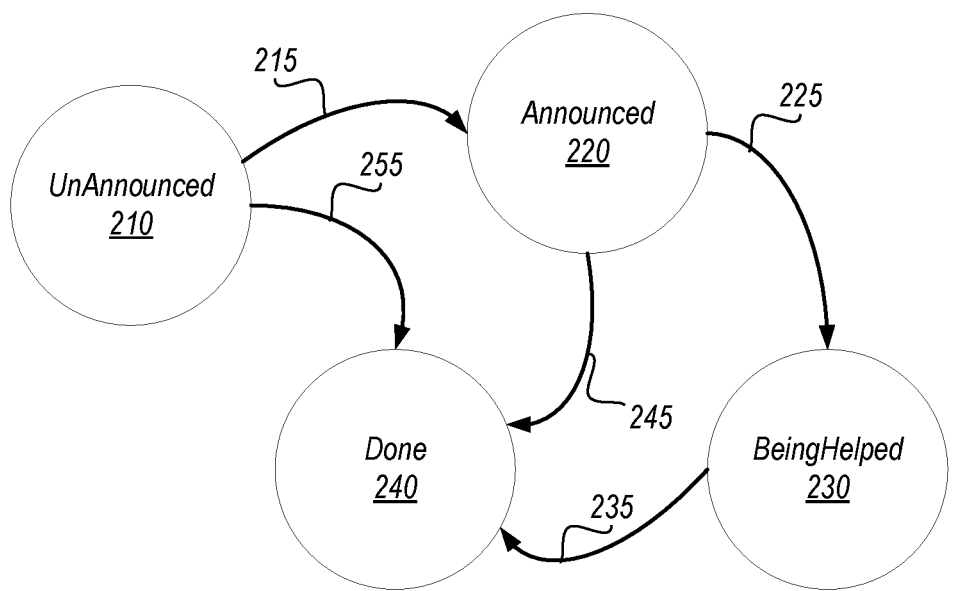
FIG. 2 is a state diagram illustrating the transitions that are possible for an operation of a multi-threaded application executing in an HTM-assisted combining framework (HCF), according to at least some embodiments.

For example, in some embodiments, a HCF framework may be configured to maintain a state field for each operation on a publication list and the operation may transition through various states as attempts are made to execute the operation (e.g., through the various logical phases described herein). For instance, in some embodiments, an operation may transition between and/or among four different states— an "UnAnnounced" state, an "Announced" state, a "BeingHelped" state, and a "Done" state. FIG. 2 is a logical state diagram illustrating various transitions that are possible for an operation of a multi-threaded application executing in an HCF framework, according to at least some embodiments.

As illustrated at 210, in one example embodiment, an operation that targets a concurrent data structure may have the status "UnAnnounced" when it is created. If the thread on whose behalf it was created is able to successfully execute the operation prior to announcing it, such as during an OwnerPreAnnounce logical phase, the operation's state may transition (as shown on path 255) to the status "Done" (at 240). Alternatively, if the thread on whose behalf the operation was invoked is not able to successfully execute the operation prior to announcing it, the operation's state may transition (as shown on path 215) to the status "Announced" (at 220). Additionally, if the thread on whose behalf the operation was invoked is able to successfully execute the operation after announcing it, such as during an OwnerPostAnnounce logical phase, the operation's state may transition (as shown on path 245) from "Announced" to the status "Done" (at 240).

Furthermore, if another thread acting as a combiner thread undertakes the task of executing the operation, the operation's state may transition (as shown on path 225) from "Announced" to the status "BeginHelped" (at 230), such as during a CombinerHTM logical phase, and if the combiner thread is able to successfully execute the operation, the operation's state may transition (as shown on path 235) from "BeingHelped" to the status "Done" (at 240).

The pseudocode examples below depict one possible implementation of a HCF framework, according to at least some embodiments. Each of the four logical phases through which a thread implementing HCF may attempt to apply an operation to a concurrent data structure, is described below using the following example pseudocode functions: tryPreAnnounce, tryPostAnnounce, tryCombineHTM, and combineUnderLock. Note that, in the examples below, the pseudocode in "HTClause" represents code that executes within a hardware transaction. If the hardware transaction is aborted, control is transferred to the corresponding "onAbort" clause as shown in the example pseudocode. Each of the logical phases are described in more detail below.

The example pseudocode below represents one embodiment of the concepts, techniques, and/or mechanisms described herein as the OwnerPreAnnounce logical phase:

```
tryPreAnnounce(OpDesc Op, OpArr Pa) {
    numFailures=0;
    while(numFailures < OwnerPreAnnounceTrials) {
        HTClause {
            if (L.isLocked( )) abortHT;
            RunSeq(Op);
            return true;
        } onAbort {
            numFailures++;
        }
    }
    return false;
}
```

Figure 3:
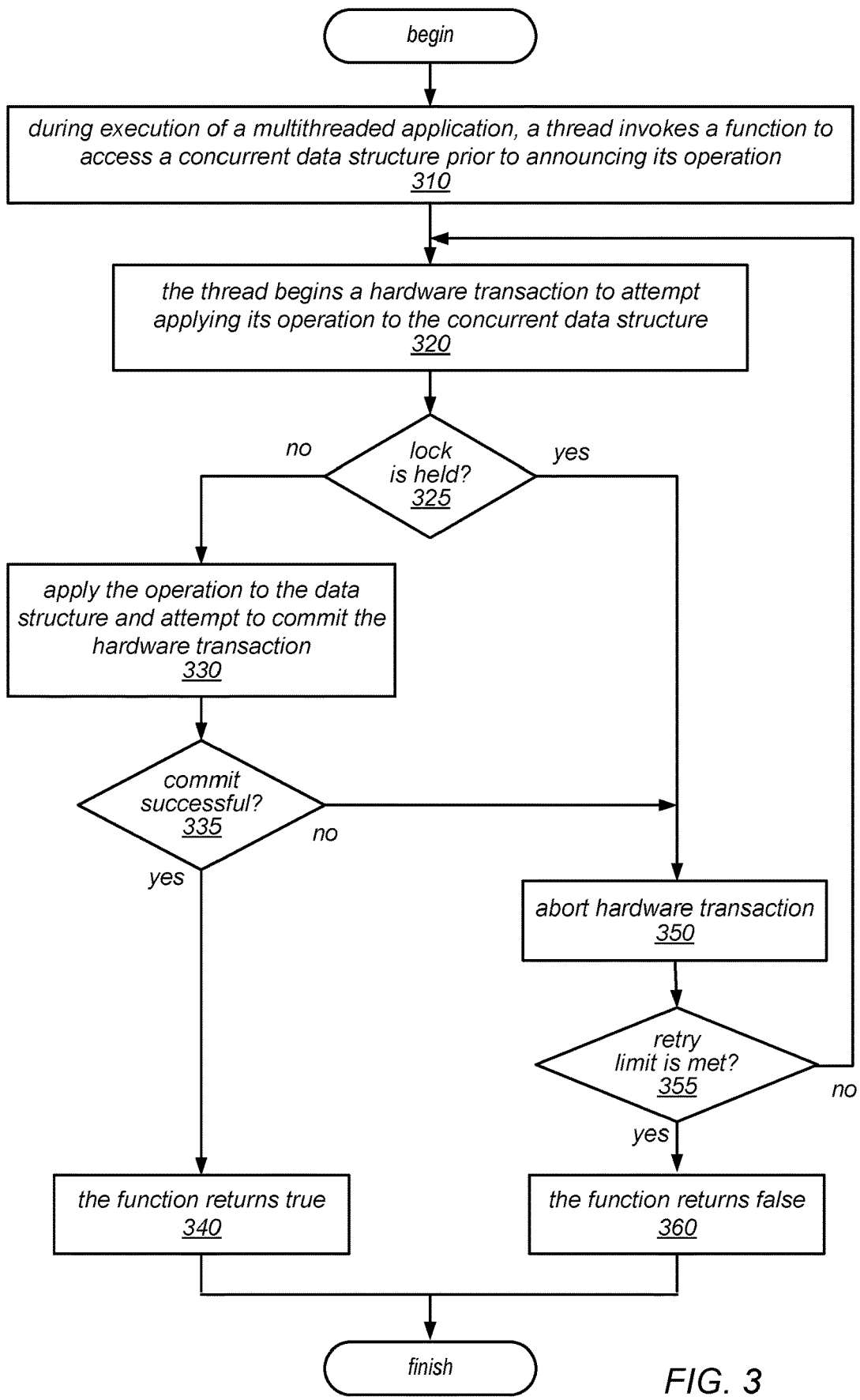
FIG. 3 is a flow diagram illustrating one embodiment of a method for a thread to access and/or operate on a concurrent data structure prior to announcing its operation.

FIG. 3 is a flow diagram illustrating one embodiment of a method for a thread to access and/or operate on a concurrent data structure prior to announcing its operation (e.g., within a OwnerPreAnnounce logical phase). As shown in block 310, during execution of a multithreaded application, a thread may invoke a function (e.g., of a HCF framework) to access a concurrent data structure prior to announcing its operation. For example, in some embodiments, a thread may invoke a function similar to the tryPreAnnounce function illustrated by the above example pseudocode.

Operations (e.g., to be applied to a concurrent data structure) may be associated with an operation descriptor including input arguments required for the sequential execution of the operation, as well as a field to storing the operation result (when applicable). In the example pseudocode above, the function that executes the sequential code of the operation given its descriptor is denoted by RunSeq.

In some embodiments, an additional status field may be added, which may be used to synchronize between the different logical phases (and/or between different threads). As noted above, in some embodiments, all operations may be initialized to an UnAnnounced state. When multiple publication lists are allowed (supported), each operation descriptor may only be included in at most one list. The number of lists and the association of operations to them may be data-structure dependent and may vary from embodiment to embodiment. Additionally, in some embodiments, both the operation descriptor and the appropriate publication list for each operation may be passed as arguments to the HCF framework's functions (e.g., the Op and Pa arguments, respectively, in the above example pseudocode).

As shown in the example above, a tryPreAnnounce function may act on an operation that is still in its UnAnnounced state, and may simply try to execute it using a HW transaction, up to OwnerPreAnnounceTrials times. Furthermore, each HW transaction may subscribe to the data structure's lock L, and may abort if the lock is acquired.

As shown in block 320, the owner thread may begin a hardware transaction to attempt to apply its operation to the concurrent data structure using the hardware transaction. As noted previously, the thread may attempt one or more times to apply the operation using a hardware transaction. Thus, as shown in the example tryPreAnnounce function above, the HTClause may be attempted a number of times equal to a predetermined OwnerPreAnnounce Trails value, according to one example embodiment. In general, the number of times a thread may attempt to apply the operation using a hardware transaction prior to announcing its operation (e.g., within the OwnerPreAnnounce logical phase) may vary from embodiment to embodiments.

If, as indicated by the negative output of decision block 325, the lock associated with the data structure is not currently held (e.g., by another thread), the thread may apply operation to the data structure and attempt to commit the hardware transaction, as in block 330. If the hardware transaction is committed successfully, as indicated by the positive output of decision block 335, the function (e.g., the function invoked by the thread to access the concurrent data structure) may return true, as in block 340. For instance, as illustrated in the example tryPreAnnounce function above, if the lock is available, the RunSeq function may be executed to apply the operation to the data structure before returning true, according to one example embodiment. As noted above, a tryPreAnnounce function may, according to one embodiment, act on an operation that is still in its UnAnnounced state, and may try to execute it using a HW transaction, up to OwnerPreAnnounceTrials times.

Furthermore, each HW transaction may subscribe to the data structure's lock L, and may abort if the lock is acquired. Thus, as indicated by the positive output of decision block 325, if the lock is held (e.g., by another thread), the hardware transaction may be aborted, as in block 350. Additionally, if the thread attempt to commit the hardware transaction was not successful, as illustrated by the negative output of decision block 335, the hardware transaction may be aborted. If a retry limit (e.g., for the number of times the thread may attempt to apply the operation prior to announcing its operation) is met, as indicated by the positive output of decision block 325, the function may stop attempting to apply the operation and may return false, as in block 360, according to some embodiments. Alternatively, if the retry limit is not met, as indicated by the negative output of decision block 355, another attempt to apply the operation to the concurrent data structure may made.

For brevity and ease of discussion, only a variant of the HCF framework, according to one embodiment, that allows at most one thread at a time to combine operations in a given publication list (i.e., by requiring that thread to acquire a lock on the publication list before combining any operations in it) is described herein. This lock may not prevent other threads from adding elements to the publication list, but may prevent other thread from becoming a combiner for these operations (i.e., for a given Pa value, only one thread at a time may run in the CombinerHTM and CombinerLock logical phases with that value). As would be apparent to one skilled in the art, the HCF framework may support multiple combiners per publication list. For example, in some embodiments, multiple combiner threads may operate on (e.g., apply operations from) different subsets of a single publication list. In still other embodiments, a similar effect may be achieved by supporting multiple publication lists. Thus, an HCF framework may support one or more combiner threads per each of one or more publication lists, thereby providing two different sources of parallelism between combiners (e.g., combiner threads) working on a concurrent data structure, according to various embodiments.

The example pseudocode below represents one embodiment of the concepts, techniques, and/or mechanisms described herein as the OwnerPostAnnounce logical phase.

```
tryPostAnnounce(OpDesc Op, OpArr Pa) {
    op.Status = Announced;
    // add operation to the publication array
    Pa.add(Op);
    numFailures=0;
    while(numFailures < OwnerPostAnnounceTrials) {
        HTClause {
            if (L.isLocked( ) || Op.status != Announced) abortHT;
            RunSeq(Op);
            // try remove Op from Pa as part of the HW Tx
            if (! Pa.remove(Op)) abortHT;
            return true;
        } onAbort {
            // avoid race with the combiner
            while (Op.status == BeingHelped) yield( );
            // return if Op was helped by a combiner
            if (Op.status == Done) return true;
            numFailures++;
        }
    }
    return false;
}
```

Figure 4:
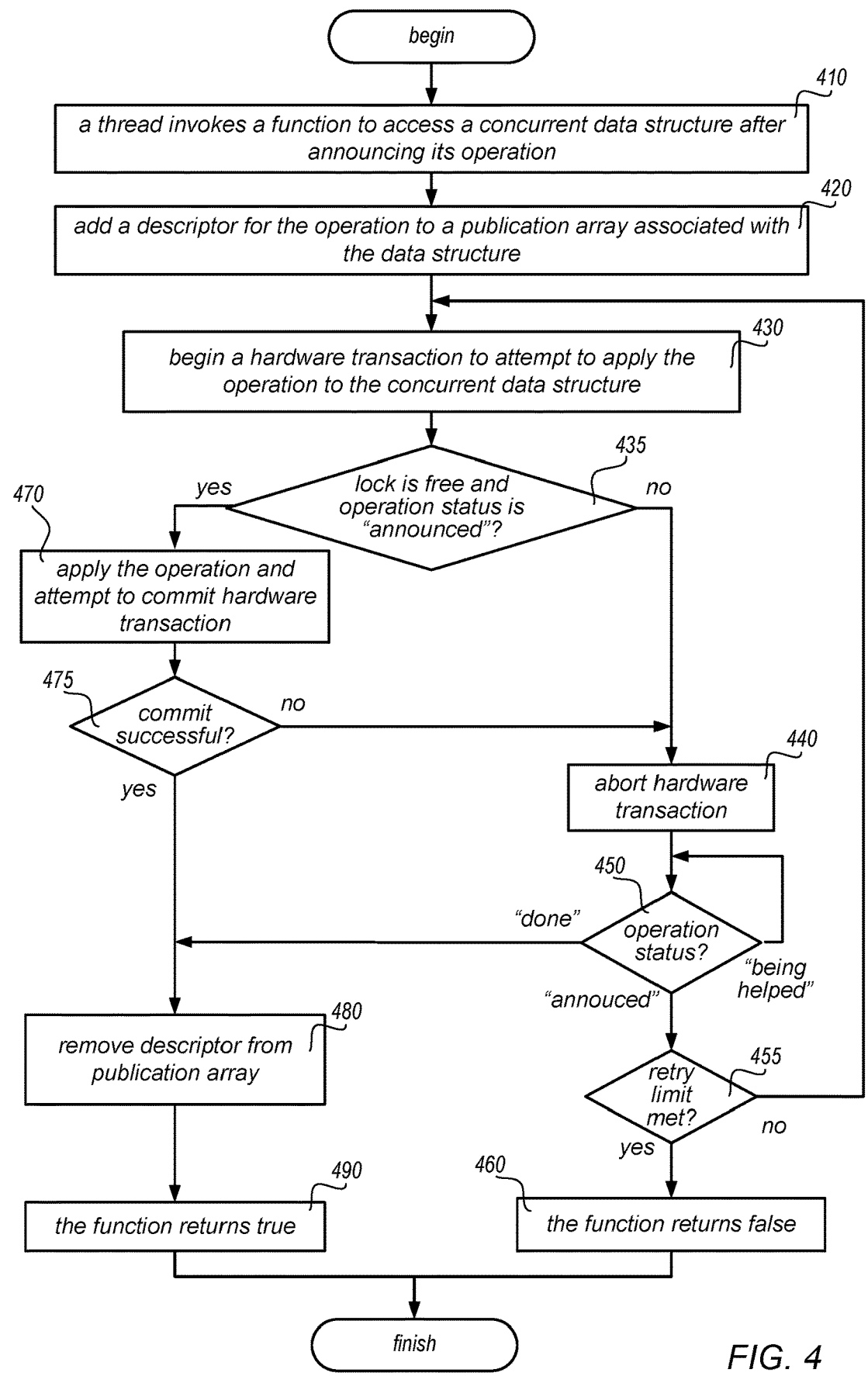
FIG. 4 is a flow diagram illustrating one embodiment of a method for a thread to access and/or operate on a concurrent data structure after announcing its operation.

FIG. 4 is a flow diagram illustrating one embodiment of a method for a thread to access and/or operate on a concurrent data structure after announcing its operation. As shown in block 410, a thread may invoke a function to access a concurrent data structure after announcing its operation, according to one embodiment. For example, if the operation was not completed in the OwnerPreAnnounce logical phase by tryPreAnnounce, the tryPostAnnounce method may be called, as in the example pseudocode above.

As shown in the example above, this method (e.g., a method invoked by a thread to access a concurrent data structure after announcing its operation) may begin by adding the operation descriptor to the publication list Pa, after setting its status to "Announced". Thus, as shown in block 420, a descriptor for the operation may be added to the publication list associated with the data structure. In some embodiments, the publication list may include one designated slot per thread, but other dynamic schemes may be implemented in other embodiments. In general, virtually any set data structure that can store, contain, hold or otherwise include, operation descriptors may be utilized as the publication list described herein. Once the operation is announced, the owner thread may try executing the operation using a HW transaction, as shown in block 430. The owner thread may attempt to execute the operation (e.g., apply the operation to the concurrent data structure) a number of times, such as up to OwnerPostAnnounceTrials times in the above pseudocode. In this case, however, because the operation is now also visible to a combiner thread, some care may be taken to guarantee that the operation is not executed twice (e.g., once by the owner and once by a combiner thread).

One solution may be to disallow the owner to run concurrently with a combiner thread. This can be achieved, according to some embodiments, by having the owner's HW transaction subscribe to the publication list lock in addition to the data structure lock, aborting if either of them is held. This solution may suffice when the publication list is small, or when the time it takes for the combiner thread to help all operations in the list is not expected to be long. In other cases, though, this solution may introduce unnecessary waiting, especially if the owner wrote the descriptor in Pa after the combiner thread has read the list and has chosen the operations it is about to help.

An alternative solution may be to have the combiner thread notify the owners of operations it is about to help (e.g., help by applying them as the combiner), by changing the operation descriptor state field to "BeingHelped", prior to running their operation. In some embodiment, changing the operation descriptor state field to "BeingHelped may be done in the tryCombineHTM function as part of the CombineHTM logical phase, as described below.

When utilizing a "BeingHelped" state, the owner may, in some embodiments, simply test (e.g., in the HW transaction that executes the operation) that its state is still "Announced", aborting the HW transaction if it is not. Thus, if the lock is available and the operation status is "Announced", as indicated by the positive output of decision block 435, the thread may apply the operation to the data structure and attempt to commit the hardware transaction, as shown in block 470. If the hardware transaction is successfully committed, as indicated by the positive output of decision block 475, the thread may then remove the operation's descriptor from the publication array, as in block 480 and the function may return true, as in block 490. For example, in the pseudocode above, upon a successful completion of the RunSeq function, the owner may remove the operation's descriptor from Pa, and complete the transaction. In some embodiments, having the removal performed as part of the same transaction that executes the operation may simplify the code used by the combiner for the "Announced"→"BeingHelped" state transition. If the hardware transaction cannot be successfully committed, as illustrated by the negative output of decision block 475, the hardware transaction may be aborted.

If the transaction aborts, as shown in block 440, and the operation is no longer in the "Announced" state, the owner may wait for the combiner to complete the operation, by spinning on the status field, waiting for it to be changed to "Done", as indicated by the "Being Helped" and "Done" outputs from decision block 450. Additionally, if hardware transaction aborted, such as due to the lock being held, but without the operation be completed by another thread, the owner thread may, if the retry limit is not met, as indicated by the negative output of decision block 455, try again to apply to the operation to the concurrent data structure using a hardware transaction. If, however, the retry limit has been met, as indicated by the positive output of decision block 455, the function may return false, as in block 460.

The example pseudocode below represents one embodiment of the concepts, techniques, and/or mechanisms described herein as the CombinerHTM logical phase:

```
tryCombineHTM(OpDesc Op, OpArr Pa) {
    while (! Pa.tryLock ( )) {
        if (Op. status == Done) return true;
        yield ( );
    }
    if (Op. status == Done)   {
        Pa.unlock ( );
        return true;
    }
    if (CombinerHTM Trials ==0) return false;
    opsToHelp = chooseOpsToHelp(Op,Pa);
    allHelped = true;
    numFailures=0;
    for (op in opsToHelp) {
        //  if the operation(s) op corresponds to are still
        //  in the publication array, update their status to BeingHelped.
        //  Otherwise do nothing and skip to the next op
        if (! updateOpStatusIfExists (op,Pa,BeingHelped)) {
            allHelped= false;
            continue;
        }
        while(true) {
            HTClause {
                RunSeq(op);
            } onAbort {
                if (numFailures++ == CombinerHTMTrials ) return false ;
                continue;    // Retry op
            }
            break;
        }
        // Remove operation(s) we helped from the publication array
        Pa.remove(op);
        // and then signal the owner that the operation is done.
        updateOpStatus(op,Done);
    }
    if ( allHelped ) {
        Pa.unlock ( );
        return true;
    }
    return false;
}
```

Figure 5A:
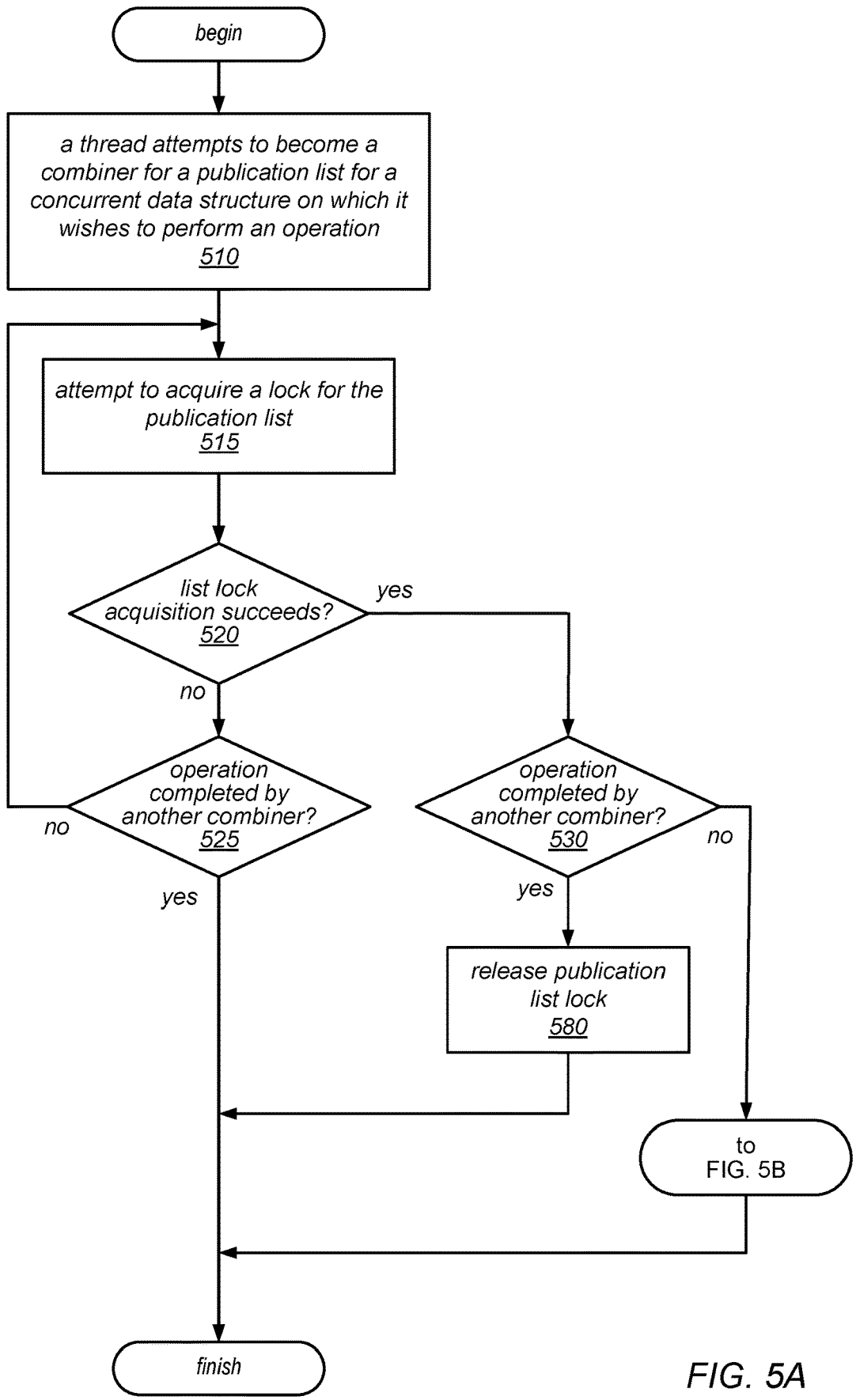
FIGS. 5A and 5B are flow diagrams illustrating one embodiment of a method for a thread to access and/or operate on a concurrent data structure by becoming a combiner.
Figure 5B:
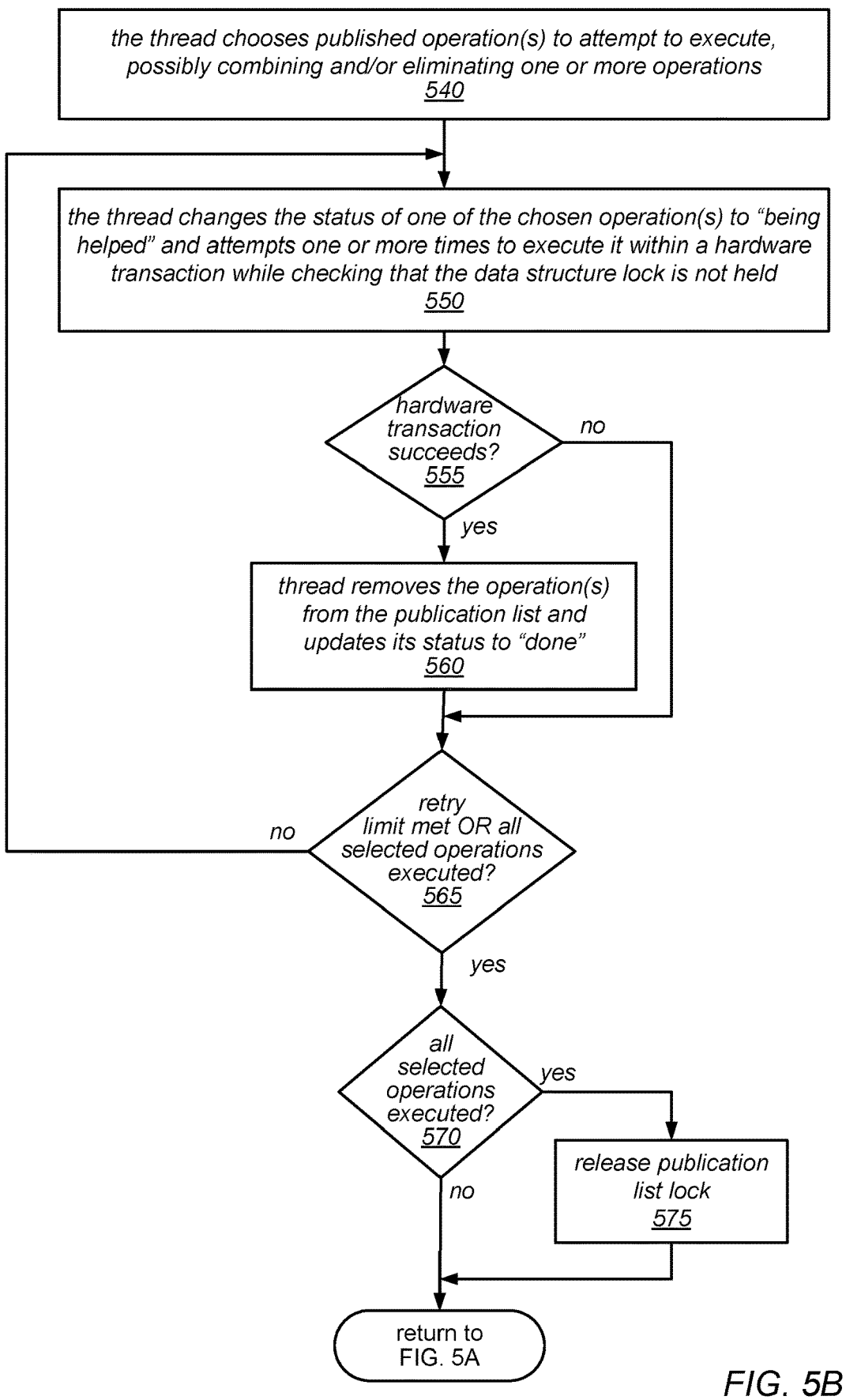

FIGS. 5A and 5B are flow diagrams illustrating one embodiment of a method for a thread to access and/or operate on a concurrent data structure by becoming a combiner. As shown in the tryCombineHTM function of the pseudocode above, the owner thread may attempt to become a combiner for the operations in Pa, by acquiring a lock on the publication list. Thus, as shown in block 510, a thread attempting to become a combiner thread for a publication list for a concurrent data structure on which it wishes to perform an operation and may attempt to acquire a lock for the publication list, as in block 515, according to some embodiments. If the thread succeeds in acquiring the list lock, as indicated by the positive output from decision block 520, and if the operation has not been completed by another combiner thread, as indicated by the negative output of decision block 530, the thread may then execute (or attempt to execute) operations from the publication list as a combiner thread, as described below regarding FIG. 5B. If, the list lock is acquired, but the operation has already been completed by another combiner, as indicated by the positive output of decision block 530, the thread may release the publication list lock, as indicated by block 580, and stop attempting to execute that particular operation (but may continue to attempt to execute other operations).

If, however, the thread is not able to successfully obtain the list lock, as indicated by the negative output of decision block 520, the thread may check to see if the operation was completed by another thread. If the operation was not completed by another thread, as indicated by the negative output of decision block 525, the thread may attempt to acquire the list lock again. Thus, according to some embodiments, the thread may keep trying to acquire the publication list lock until either it succeeds (in acquiring the list lock) or until the operation is completed by another combiner.

The thread may then choose one or more published operations (e.g., operations whose descriptors are included in the publication list) to execute, possibly combining and/or eliminating one or more operations, as shown in block 540 of FIG. 5B. For instance, in one example embodiment illustrated by the pseudocode above, the thread may choose a subset of the operations in the publication list (i.e., Pa in the pseudocode above) that it would like to help (e.g., execute on behalf of other threads), and may attempt to execute each of the chosen operations using a HW transaction. When selecting a subset of operation to execute, the thread may select both its own operation and other threads' operations.

Before attempting to execute a particular operation, the thread may change the operation's state to a "BeingHelped" status, such as to allow other threads to know that it has selected that operation and is attempting to execute it. Thus, as shown in block 550, the thread may change the status of one of the chosen operations to "BeingHelped" and may also attempt (one or more times) to execute the operation (e.g., apply it to the concurrent data structure) within a hardware transaction. In some embodiments, the thread may execute operations in a manner that facilitates combining and/or elimination of operations, while avoiding races with the owners of the helped operations.

In some embodiments, an abstract function provided by a HCF framework, such as the chooseOpsToCombine in the pseudocode above, may be invoked to select the subset of operations from the publication list to be helped (e.g., executed or applied on behalf of other threads). This function may simply return a subset of the original operations descriptors, or it may also return a meta-operation that combines multiple operations into a single, more efficient operation, according to different embodiments. For instance, in one example embodiment, sequential code for removing the N smallest elements in a priority queue may be likely to perform much faster than calling a function, such as RemoveMin, N times. In some embodiments, the function invoked to select operations (e.g., chooseOpsToCombine in the above pseudocode example) may create a new operation descriptor to sequentially execute N RemoveMin operations together (e.g., at one time), and return the new descriptor as a single meta-operation in the opsToCombine set.

Thus, in some embodiments, once a subset of operations has been selected by a combiner, a single operation in the selected subset may correspond to multiple operations in the original publication list. For example, using the pseudocode example above, each operation op in opsToCombine may correspond to one or more operations in Pa, and the RunSeq method for op may be responsible for executing the sequential code that combines these operations, as well as distributing the return values. Therefore, when a combiner thread attempts to apply an operation within a hardware transaction, as in block 550, that operation may be a single operation or may be a meta-operation.

Additionally, in some embodiments, the function provided by the HCF framework and invoked by the combiner thread to select the operations to execute may also control the number (e.g., the min and/or max number) of operations to be executed in each hardware transaction. For instance, according to the example pseudocode above, the chooseOpsToCombine function may control the number of operations executed in each hardware transaction during the CombinerHTM logical phase.

As illustrated above, the combiner may perform the "Announce"→"BeingHelped" transition for all operations in Pa that op corresponds to, before it starts the HW transaction that executes them. In some embodiments, the thread may ensure that the status field of a descriptor whose operation was already completed by its owner, and that was removed from Pa is not changed (this may be especially important when implemented in languages without garbage collection support, where changes in objects that were already deallocated may result in erroneous behavior). However, in some embodiments the owner may remove a descriptor from the publication list only as part of the HW transaction that executes the descriptor's operation. Thus, in some embodiments, HCF may guarantee that the descriptor is not removed during the state transition. For example, a CAS operation may be used to mark the slot in Pa that references the descriptor with a value that will cause the Pa.remove operation to abort the HW transaction. In some embodiments, the HCF framework may provide a function that performs this logic, such as an updateOpStatusIfExists function (whose code is omitted for brevity).

Once the transition is done for the operations that the executed op corresponds to, tryCombineHTM may try to execute the sequential code for these operations in a HW transaction, and if it succeeds, may remove the descriptors for these operations from Pa, and update their status to "Done". Thus, if, as indicated by the positive output of decision block 555, the hardware transaction succeeds, the thread may remove the operation from the publication list update the operation's status to "Done", as in block 560. Furthermore, if the completed operation was a meta-operation (e.g., that combined multiple operations), the thread may remove the descriptors for all the original operation to which the completed meta-operation corresponds and may set the status of each of them to "Done".

Removing a completed operation from the publication list and updating its status to "Done" before proceeding to the next operation to execute may, in some embodiments, allow additional parallelism. For example, the owners of completed operations may notice that the operation was completed and proceed to execute new operations in parallel with the combiner thread while the combiner thread works on other selected operations.

Additionally, in some embodiments if the hardware transaction used to execute a selected operation fails, as indicated by the negative output of decision block 555, the combiner thread may retry to execute the failed operation again. Alternatively, the thread may attempt to execute another of the selected operations (or meta-operations) from the selected subset (if there are more to attempt). The thread may then attempt to execute another of the selected operations (or meta-operations) from the selected subset (if there are more to attempt), and if the retry limit has not been met and there are more operations to apply, as indicated by the negative output of decision block 565. In some embodiments, a thread may utilize a total number of retries with which to apply one or more operations. Thus, a thread may retry to apply the same operation again if a first attempt fails and may use more than one attempt to apply an operation. After the thread successfully applies one operation, it may then attempt to apply one or more other operations, as long as the total number of attempts does not exceed the total retries available to the thread. The actual number of retries available to threads may vary from embodiment to embodiment and may be adjustable in some embodiments.

As indicated by the positive output of decision block 565, if the retry limit has been met (e.g., if the total number of times the thread has attempted to apply operations is greater than a retry limit) or if all the selected operations have been executed, the thread may then cease trying to apply operations. If the thread successfully executed all the selected operations (e.g., the selected subset), as indicated by the positive output of decision block 570, the thread may then release the publication list lock, as in block 575. In some embodiments, If a thread was not able to execute all the selected operations within the total retries available, as illustrated by the negative output of decision block 570, an indication may be returned (e.g., the tryCombineHTM function in the pseudocode above may return false). Additionally, if the thread did not successfully execute the selected operations, it may attempt to execute those operations without utilizing hardware memory, such as during a CombinerLock logical phase without releasing the publication list lock between the CombinerHTM and CombinerLock logical phase, as illustrated by the negative output of block 570 not releasing the publication list lock. Thus, in some embodiments, if the thread was not able to execute all the selected operations, the publication list lock acquired by a thread in the CombinerHTM logical phase (as in the example tryCombineHTM function pseudocode above) may not be released until after the operations have been executed during the CombinerLock logical phase, as will be discussed below.

For ease of illustration, FIG. 5B combines multiple features of the example pseudocode above. For example, the functionality illustrated by box 550, may represent a thread attempting to apply an operation for the first time, or may represent the thread retrying a failed operation again, or may represent the thread attempting to apply a different operation after successfully applying one operation. Thus, after attempting to apply an operation and returning back to block 550, as indicated by the negative output of decision block 565, the thread may be retrying to apply the same operation again after a previous failure or may be attempting to apply a different operation, if the previous operation was successfully applied.

While not illustrated in the FIG. 5B, in some embodiments a combiner thread may, after selecting a subset of the operations to execute, mark those operations (e.g., change their status) as being selected or claimed (or remove those operations from the publication list) and release the lock on the publication list before attempting to execute those operations. Thus, other threads may become combiners, selecting different subsets of operations in the publication list to attempt to execute, thereby possibly providing additional parallelism. In such embodiments, however, a combiner thread may return operations that it failed to successfully execute (e.g., apply) to the publication list, allowing other threads to (attempt to) execute them.

In other embodiments however, a combiner thread may not attempt to execute additional operations after a hardware transaction fails, but may instead attempt to execute the operations without a hardware transaction by acquiring the lock associated with the concurrent data structure, as described below. For example, using the pseudocode above, if tryCombineHTM does not succeed in executing all operations in opsToCombine with at most CombinerHTMTrials HW transactions failures, the function may return false and the rest of the operations may be executed by the combineUnderLock function, described below.

The example pseudocode below represents one embodiment of the concepts, techniques, and/or mechanisms described herein as the CombinerLock logical phase:

```
combineUnderLock(OpDesc Op, OpArr Pa) {
   L.lock ( );
   opsToCombine = chooseOpsToHelp(Op,Pa);
   for (op in opsToCombine) {
      RunSeq(op);
      // Remove operation(s) this thread helped from the publication array
      Pa.remove(op);
      // and then signal the owner that the operation is done
      updateOpStatus(op,Done);
   }
   Pa.unlock( );
   L.unlock( );
}
```

Figure 6:
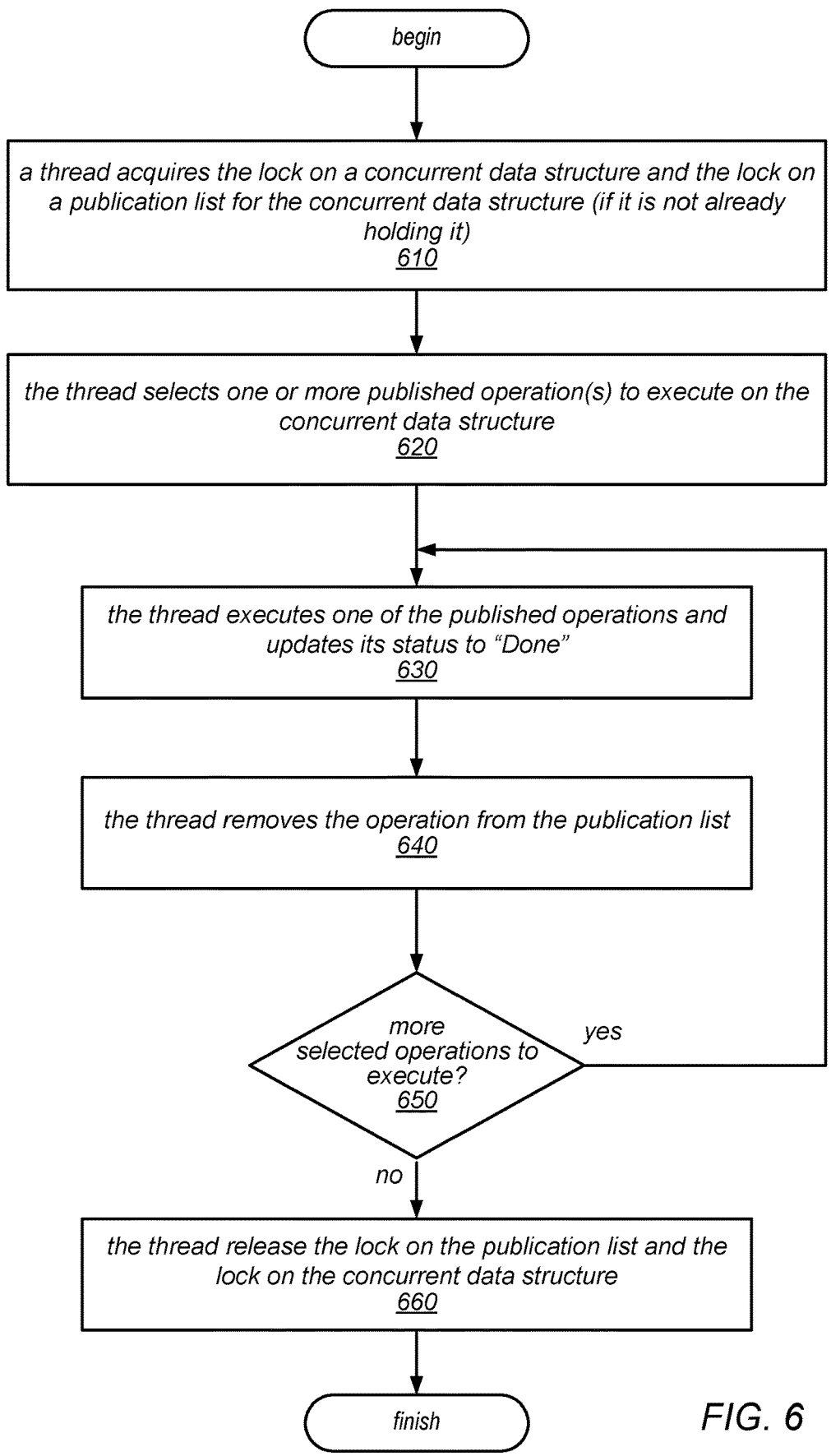
FIG. 6 is a flow diagram illustrating one embodiment of a method for a thread to access and/or operate on a concurrent data structure by acquiring its lock.

FIG. 6 is a flow diagram illustrating one embodiment of a method for a thread to access and/or operate on a concurrent data structure by acquiring its lock. For instance, a thread may acquire the lock on a concurrent data structure and the lock for a publication list for the concurrent data structure, as in block 610. In some embodiments, the publication list lock may have been acquired by the thread previously as part of other attempts to execute operations on the data structure (e.g., as part of other logical phases). The thread may then select one or more of the published operations (e.g., operations whose descriptors are included in the publication list) to execute on (e.g., apply to) the concurrent data structure, as in block 620. For example, as illustrated in the pseudocode above, the combineUnderLock function may acquire the data structure lock L, which may prevent any other threads from successfully executing any operation on the data structure using a HW Transaction. At that point, the combiner thread may, in some embodiments, choose the subset of operations left to be combined, and call RunSeq to execute them, without the need to change their states to a "BeingHelped" status.

After executing one of the published operations and updating its status to "Done" as in block 630, the thread may execute additional operations, if there are more selected operations to execute, as indicated by the positive output of decision block 650. After executing the operation, the thread may then remove the operation (or the operation's descriptor) from the publication list, as in block 640. Once there are no more selected operations to execute, as indicated by the negative output of decision block 650, the thread may release the lock on the publication list and the lock on the concurrent data structure, as in block 660. Thus, once the operations are complete, their descriptors may be removed from Pa, the owners may be notified of the completed operations, and both the lock on Pa and on the data structures may be released, according to the example embodiment illustrated by the above pseudocode.

Figure 7:
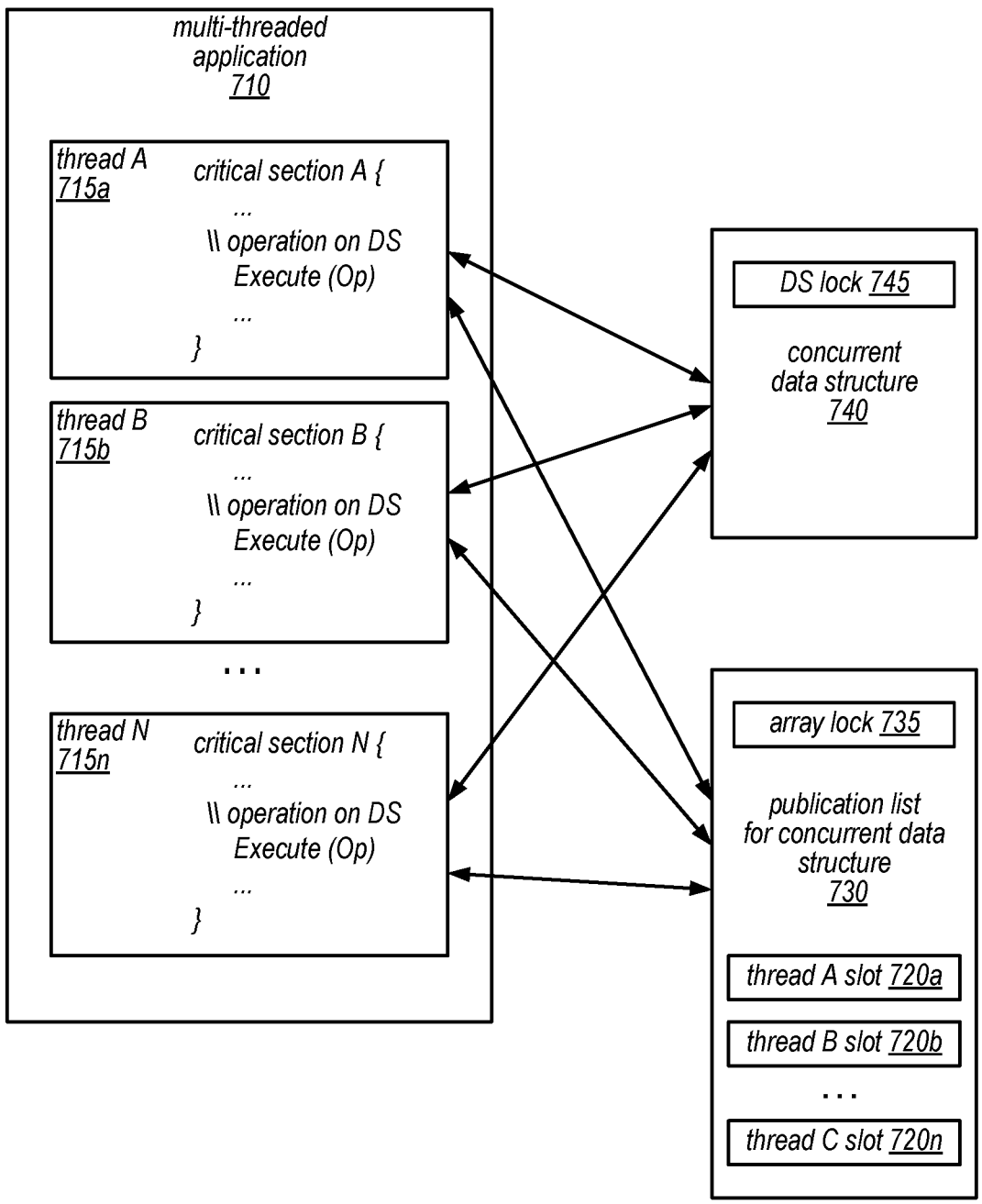
FIG. 7 is a logical block diagram illustrating a multi-threaded application including multiple threads that operate on a concurrent data structure, according to one embodiment.

As described above, the features, concepts, techniques, and/or mechanisms described herein regarding HCF may be implemented within a multi-threaded application in which multiple threads execute operations targeting a concurrent data structure. FIG. 7 is a logical block diagram illustrating a multi-threaded application including multiple threads that operate on a concurrent data structure, according to one embodiment. As illustrated in FIG. 7, a multi-threaded application 710 may include multiple threads, such as thread A (shown as 715a), thread B (shown as 715b), and thread N (shown as 715n), each of which may include a critical section that includes (at least) an operation targeting concurrent data structure 740. Thus the multiple threads of multi-threaded application 710 may operation concurrent data structure and/or may access a publication list associated with the concurrent data structure to publish its operation and/or to execute one or more published operations, according to some embodiments.

In the example embodiment illustrated in FIG. 7, each thread may call a function, such as the Execute(Op) function described above, that goes through (up to) four logical phases (e.g., OwnerPreAnnounce, OwnerPostAnnouce, CombinerHTM and CombinerLock logical phases described above) in order to execute the specified operation. For example, one or more attempts may be made to execute the operation within a hardware transaction prior to announcing the operation (e.g., in an OwnerPreAnnounce logical phase), one or more attempts may be made to execute the operation within a hardware transaction after announcing operation (e.g., in an OwnerPostAnnouce logical phase), one or more attempts may be made to execute the operation (and, in some cases, other pending operations) within a hardware transaction by a combiner thread that holds a lock on the list of published applications (e.g., in a combinerHTM logical phase), and/or the operation (and/or, in some cases, other pending operations) may be executed under the lock associated with the data structure without using a hardware transaction (e.g., in a CombinerLock logical phase).

In the example embodiment illustrated in FIG. 7, the concurrent data structure 745 may be associated with a lock 745, and a publication list 730 for the concurrent data structure may be associated with a lock 735. Additionally, publication list 730 may include a designated slot for each thread of multi-threaded application 710 (shown as slots 720a, 720b, and 720n), although other publication list configurations may be employed in other embodiments.

HCF Customization

As mentioned earlier, in some embodiments the HCF framework may be customized in various ways to implement different techniques for various data structures. For instance, the number of times a thread may attempt to execute an operation in each of the various logical phases may vary from embodiment to embodiment. For example, according to the embodiment illustrated in the above pseudocode, the values of the OwnerPreAnnounceTrials, OwnerPostAnnounceTrials and CombinerHTMTrials constants may be customized for various data structures, workloads, applications, and/or policies. As used herein, a variant of HCF that uses X trials in the OwnerPreAnnounce logical phase, Y trials in the OwnerPostAnnounce logical phase, and Z trials in the CombinerHTM logical phase may be denoted by HCF<X,Y,Z>. In another example, there may be a choice for the number of publication lists and policies for assigning operations to them. Thus, in some embodiments, the HCF framework may be customized to allow for dynamic modification of the number of publications list and the policies utilized for assigned operations to them. In yet another example, a chooseOpsToCombine implementation (e.g., a custom or customizable implementation) may control the aggregation of multiple operations into a single, more efficient, operation (e.g. via elimination and/or a more efficient sequential implementation), and/or selective combining.

A HCF framework may be customized not only for a particular data structure, but may also allow divergent customization for different operations of the same data structure, according to various embodiments. Moreover, the customization may be dynamic. In other words, after beginning execution with a certain number of publication lists and a certain assignment policy, a HCF framework may be configured to allow the number of publication lists and the assignment policy to be changed on-the-fly (e.g., such as to better fit the particular workload).

Various aspects of HCF may be demonstrated using two example data structures: a skip-lists based priority queue, and an AVL tree based set, discussed below.

Using HCF with Skip-Lists Based Priority Queue

Priority queues generally support two main operations: RemoveMin and Insert. The RemoveMin operation removes the element with the minimal key in the queue, and hence may necessarily conflict with any concurrent operation that accesses that same element—including other concurrent invocations of RemoveMin. The Insert operation, on the other hand, may provide some potential parallelism with some implementations—such as skip-lists based and balanced trees based priority queues. A skip-list based priority queue was chosen for evaluation, as its RemoveMin operation may be very short (removing the first node in the skip-list), and multiple invocations of it can be efficiently combined (e.g., N RemoveMin operations simply remove the first N nodes in the skip-list).

In this example, because of the different characteristics of RemoveMin and Insert, an example HCF framework was customized, according to one example embodiment, to include two separate publication lists—one for each operation type. An HCF<0,0,Z> implementation, for a non-zero Z value, was chosen such that up to Z trials for combining RemoveMin operations may be performed in parallel with other hardware transactions that execute Insert operations.

According to the example embodiment, the chooseOpsToCombine method chosen for this operation scans the publication list, copies and stores the thread IDs that have pending RemoveMin operations, and returns a single meta-operation that removes the N first elements in the skip-list, (where N is the number of pending operations observed). Once the removal is done, the stored thread IDs are used for distributing the removed keys to the return value fields of the descriptors for the operations that were helped. For the Insert operation, a few methods were evaluated, according to the example embodiment. First, traditional TLE was used. This is safely supported by the HCF framework, but has the disadvantage that Insert operations that do fail in HTM (e.g., due to contention) acquire the data structure lock, and stop all other operations, including RemoveMins.

To avoid that situation, an HCF framework may be customized for better contention control between the Insert operations, such as by using HCF<X,Y,Z>, with non-zero X and Z values, and a chooseOpsToCombine function that returns the owner's operation (i.e., no helping is provided). Thus, if a thread fails X times to execute its operation in HTM only continues to try those operations in HTM if there is no active combiner. Thus, the amount of parallelism may be reduced if operations that fail more than X times in HTM do not run concurrently with each other (e.g., once one of them runs in the CombinerHTM phase). On the other hand, operations that run in the CombinerHTM phase may still run in parallel with operations in the other publication list, namely the RemoveMin operations, according to the example embodiment. Experiments were performed with both Y=0 and Y>0 values, as will be discussed in more detail below.

Using HCF with AVL Tree Based Set

Unlike the priority queue's RemoveMin operation, there may be no straightforward candidates for combining or elimination of set operations for some concurrent data structures, such as when using an AVL tree based set. However, similar to the Insert operation in priority queue, in some embodiments, the HCF framework may provide better concurrency control between the set's operations. Additionally, in some embodiments, a HCF framework may be customized to exploit the tree structure of a balanced tree based set for dictating the assignment to multiple publication lists (e.g., so that parallelism is only restricted between operations that are more likely to conflict with each other).

In these experiments, two publication lists were used, one for the left and one for the right subtrees of the root node. The rational for this choice is that operations on keys in the right subtree are unlikely to conflict with operations on keys in the left subtree, and thus they may be able to run in parallel with each other. In other words, the knowledge of the tree structure was exploited to "guess" which operations may conflict with each other, and guide these operations to use a HCF variant that can restrict the parallelism between them when such conflicts happen. Please note that the particular features concepts, techniques and/or mechanisms of HCF described regarding these experiments, as described herein represent only one possible embodiment of HCF, and those features concepts, techniques and/or mechanisms may vary from embodiment to embodiment.

To support this setup with HCF, two publication lists were allocated, and it was decided which of them to use for a given operation by comparing the operation's key to that of the root. This was implemented by having the Insert and Remove operations update a look-aside variable that holds the root's key (note that this key almost never changes). Note that while the experiments used only two publication lists for the two largest subtrees, in other embodiments, this scheme may be extended to support $2^i$ publication lists, one for each subtree at depth i. For each of the subtrees, the same algorithm was used as with the priority queue Insert operation—that is, HCF<X,Y,Z> with X>0, Z>0, and both Y=0 and Y>0 variants, and a chooseOpsToCombine that simply returns the owner's operation.

Correctness

In some embodiments, using HCF with a sequential implementation of a data structure may result in a correct, linearizable concurrent implementation of the data structure. Firstly, if an operation is applied to a concurrent data structure via the HCF framework, it may be applied either while holding the data structure lock, or while inside a hardware transaction. According to some embodiments, no hardware transaction may successfully commit if the lock is acquired at any point after the transaction first accesses the data structure. A hardware transaction that accesses the data structure while the lock is held, or if the lock is acquired after the transaction first accesses the data structure, the hardware transaction will be aborted—and will therefore have no effect on the data structure (or the operation execution). Thus, since no hardware transaction can successfully access the data structure (e.g., successfully commit) while the lock is held (or if the lock is acquired after the transaction first accesses the data structure), the operation seems to take effect atomically, either when the transaction commits or when the lock is released, according to some embodiments.

Secondly, every operation may be considered to always take effect between the operation's invocation and response. This may be trivial when the operation is applied by its owner thread. However, when the operation is applied by a combiner, the combiner may only learn about the operation after the operation has been invoked. Additionally, in some embodiments, the combiner may change the status of the operation to "Done" only after the operation takes effect. The owner of the operation may return a response only after it learns that the status of the operation was changed to "Done". Thus, even when the operation is applied by a combiner, the response may only be returned after the operation takes effect, according to some embodiments.

Additionally, an operation may never be applied more than once by the HCF framework. In some embodiments, each announced operation may have exactly one descriptor, associated with exactly one publication array. Thus, for any pair of Op and Pa, no series of invocations of the HCF methods may result in multiple applications of Op.

With reference to the example pseudocode described above, if the first invocation of RunSeq with Op that completed successfully (i.e, it was executed by a committed hardware transaction, or while holding the lock L) was performed by the example tryPreAnnounce function, then Op is not yet stored in the Pa at that point, and thus could not be executed by any other thread running as a combiner, according to some embodiments. Therefore, the operation was applied exactly once.

If the first successful invocation was done by the example tryPostAnnounce function, then according to the example implementation of HCF described herein: a) the data structure lock L was not held, b) the operation descriptor status field had the "Announced" value when the operation took effect, and c) The operation descriptor was removed from Pa as part of the transaction that applied Op. The fact that the status of the operation was still "Announced" when it was applied implies that a combiner thread in the example tryCombineHTM function has yet changed its status to "BeingHelped". The fact that the descriptor was successfully removed from Pa in the hardware transaction implies that any further attempt to change the status of Op in updateOpStatusIfExists will fail, and thus the operation is applied exactly once.

Similarly, the example tryCombineHTM function only executes Op if it first changes its status to "BeingHelped", which, as explained earlier, can only succeed if the descriptor is still in the publication array. Thus, if Op was applied by the example tryCombineHTM function, it must be in a "BeingHelped" state, and hence can no longer be applied by the example tryPostAnnounce function, according to one example embodiment. Furthermore, upon successful completion of Op, the example tryCombineHTM function removes the operation from Pa, and changes its status to "Done". The order of these two steps may be considered critical, because once the operation status changes to "Done", the operation owner may proceed and re-use the publication array slot for a different operation, in some embodiments. Unlike the example tryPreAnnounce and tryPostAnnounce functions, the example tryCombineHTM function may return false even if Op was successfully completed. However, because the descriptor of Op in that case may no longer be in the publication array, the example combineUnderLock function will not execute Op again.

Finally, we note that while the example combineUnderLock function described herein does not change the status of operations it applies to "BeingHelped", it may run after acquiring L. This may, in some embodiments, disallow the owner of Op to make any progress until L is released or Op is completed (unless the owner of Op happens to be the combiner). Once the combiner applies Op in the example combineUnderLock function, it changes its status to "Done". Since the owner of Op checks the status of Op in a HW transaction in example tryPostAnnounce function and right after becoming a combiner and ac-quiring the lock on Pa in the example tryCombineHTM function, it will not attempt to apply Op again. Furthermore, since the combiner removes Op from Pa after its application, another combiner will not attempt to apply Op either.

Furthermore, if the lock on the concurrent data structure and the locks on the publication arrays guarantee starvation freedom, a concurrent implementation of a data structure that uses the HCF framework may, according to some embodiments, also be starvation free. For instance, each operation may eventually complete as long as a thread that is holding the lock keeps taking steps and eventually releases the lock.

Performance Evaluations
HCF Vs. FC and TLE

A qualitative comparison of HCF to the original FC technique is presented first. Concurrent threads make most use of HTM when they do not conflict with other; when data conflicts are frequent, time spent of futile HTM attempts is wasted. As a result, one might not expect HCF always to be the winner when the contention is high, e.g., when experimenting with a stack or when a priority queue is used in a workload composed solely from RemoveMin operations. In fact, in these cases, and especially on low thread counts, a simple approach that uses a coarse lock (without any combining) might perform better than any other alternative, including FC and HCF.

It may be expected that a benefit of HCF over FC, however, would be evident when a data structure does allow at least some amount of parallelism. The HCF algorithm is designed to exploit this parallelism in multiple dimensions. First, it allows threads to access the shared data structure concurrently without any help from a combiner. Second, even when a thread fails to complete its operation on its own and decides to become a combiner, it allows other threads, including other combiners and non-combiners, to proceed concurrently. As a result, HCF is likely to provide substantial benefit over FC in a wide range of data structures and workloads, from FIFO queues to priority queues to search trees.

HCF Vs. TLE

When comparing HCF to TLE, it was noted that differences in performance results may arise only in workloads that involve contention. Otherwise, when threads apply their operations with one (or a few) HTM attempt(s), the techniques may be equivalent and may be expected to deliver the same performance. Under contention, however, HCF has two important advantages over TLE. First, it enables combining and elimination, potentially reducing the total amount of work required under the lock. Second, when using multiple combiners, HCF reduces contention on the global lock that protects the access to the shared data structure. This is because the largest number of threads competing over this lock is equal to the number of combiners in HCF as opposite to the total number of threads in TLE. Thus, while the actual benefit of HCF over TLE depends on the number of combiners and the potential for the combining and elimination optimizations, this benefit is expected to increase with the contention level, leading to better scalability for HCF.

Experiments with Priority Queues

In these experiments, the HCF algorithm was implemented in C++, according to one example embodiment. Using a standard sequential implementation of skip lists that supports RemoveMin and Insert operation, HCF was employed to devise a concurrent priority queue. To support combining of multiple RemoveMin operations, the implementation of skip lists was extended by adding a (sequential) method RemoveSmallestK to remove the smallest k elements from the queue. As noted above, two publication lists may be used, e.g., one for RemoveMin operations and another for Insert operations.

In all presented HCF-based variants, RemoveMin operation used HCF<O, 0,10>, and a combiner applied the combing optimization on all pending RemoveMin operations by using a version of chooseOpsToCombine function that selected all such operations. Thus, all RemoveMin operations performed FC-like synchronization where a combiner tries up to ten times to apply the combined operations using HTM. For Insert operations, a combiner that helps only its own operation was used. This is because it was not expected that the combiner helping other Insert operations would be useful, as such a combiner might fail on HTM due to capacity limitations and consequently grab the lock for prolonged periods of times. Yet, the HCF-based variants differed in the number of HTM attempts in each phase. The first variant, denoted in charts as HCF<10, 0,0>, performed essentially TLE for Insert. Note that every time an Insert operation would fail in ten attempts in the OwnerPreAnnounce phase, it would revert to the lock, stopping all other operations, including RemoveMin. The other two variants, denoted as HCF<5,0,5> and HCF<2, 3,5>, make use of the CombinerHTM phase, differing only in the partitioning of HTM attempts between the OwnerPreAnnounce and OwnerPostAnnounce phases. Note that once some thread enters the CombinerHTM phase in these two variants, it would still allow the combiner of RemoveMin to proceed on HTM.

These three HCF-based variants were compared to implementations that use a simple test-test-and-set (TTS) lock, the TLE technique with ten HTM attempts, and the FC technique. For the latter, a combiner thread would combine all pending RemoveMin operations and apply Insert operations one after another. In addition to these algorithms, HCF was used to implement a naïve combination of TLE and FC, called simply TLE+FC, where a thread would try ten attempts on HTM and, if failed, proceed as in the FC algorithm by announcing its operation and trying to become a combiner.

The experiments were run on an Intel Haswell (Core i7-4770) 4-core hyper-threaded machine (8 hardware threads in total) running at 3.40 GHz and powered by Oracle Linux 7. The machine was set up in the performance mode (i.e., the power governor was disabled, while all cores were brought to the highest frequency), with the turbo mode disabled. This was done to reduce noise from the power management system.

In each experiment, threads applied operations in iterations; at each iteration, a thread selected an operation uniformly and randomly from the given workload distribution. The average total throughput was calculated as a function of the number of threads based on five runs per each configuration.

Figure 8A:
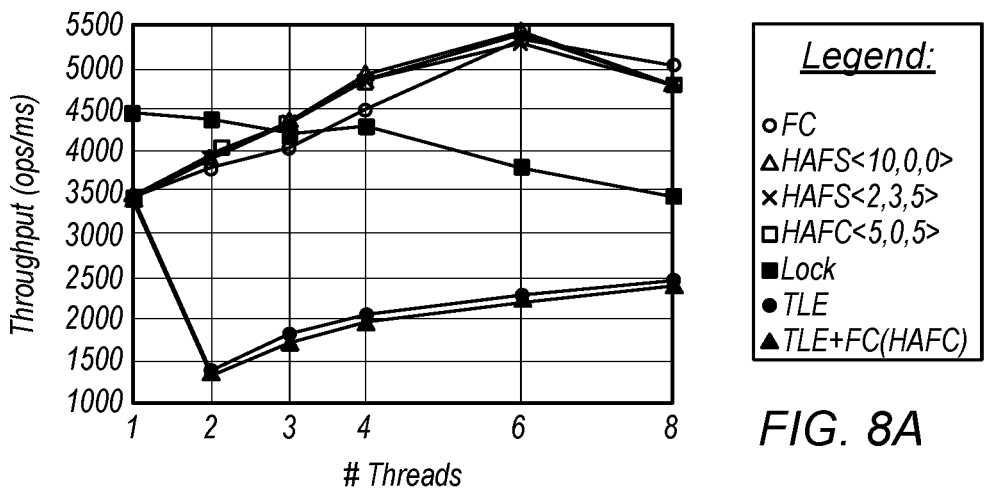
FIGS. 8A-8C and 9A-9C illustrate the relative performance of multi-threaded applications that utilize HCF, according to various embodiments.

FIG. 8A shows results for the workload consisting of only RemoveMin operations. Each thread gets the same share of operations to apply, calculated as the initial capacity of the queue (500M random keys) divided by the number of threads, and the time was measured until the queue became empty.

Figure 8B:
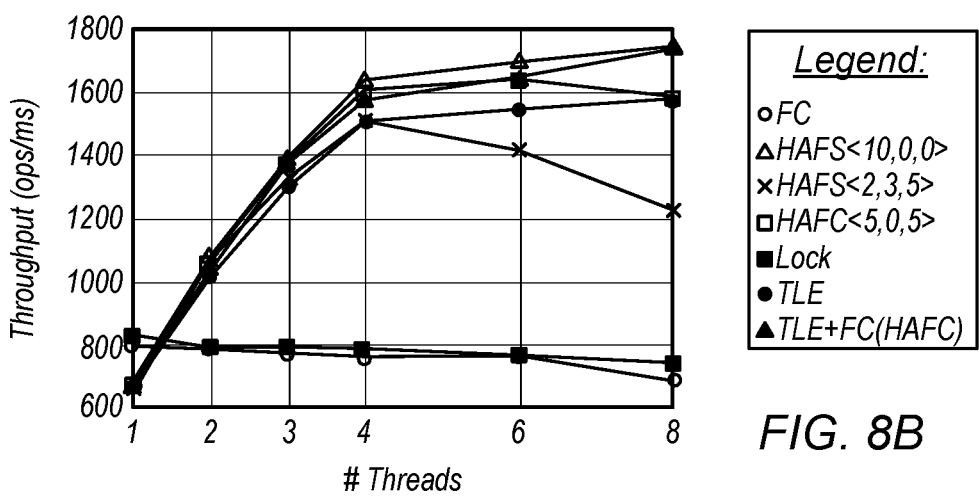

FIG. 8B shows another extreme workload, where all threads perform the same number of Insert operations, starting with an empty queue and until the queue contains 500M keys. Once the queue starts to fill up, threads rarely conflict with each other. As a result, optimistic execution on HTM is very effective, which shows up in the result achieved by TLE. HCF variants provide competitive performance, at least up to 6 threads. Along with that, FC fails to achieve any scalability since Insert operations (unlike RemoveMin) do not benefit from aggressive combining.

Figure 8C:
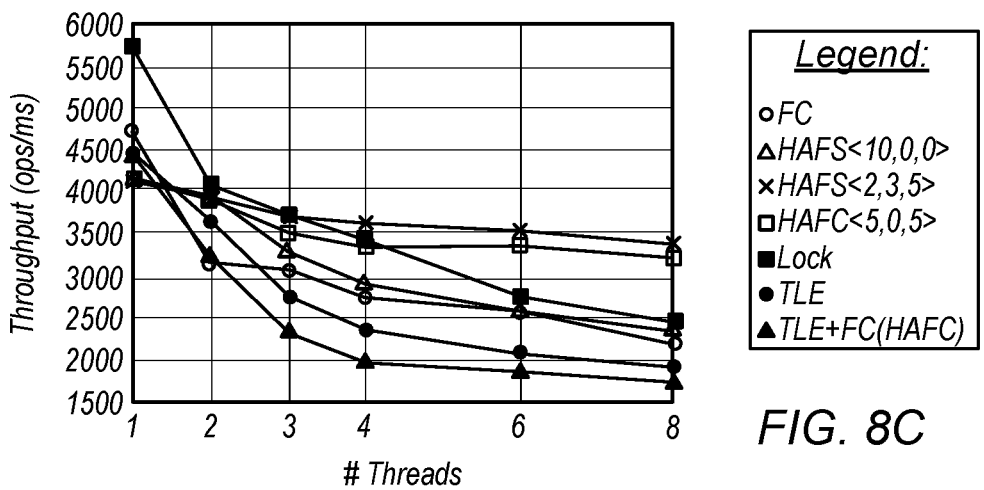

The most interesting results, however, are for a mixed workload, and are shown in FIG. 8C. In these experiments, the queue is initialized with 500M keys; threads run for five seconds and on each iteration choose between RemoveMin and Insert with equal probability. Here, the power of an HCF framework that manages to exploit the concurrency of Insert operations while effectively coping with contention of RemoveMin operations is illustrated. This helps HCF<5,0, 5> and HCF<2,3, 5> to outperform both TLE and FC variants by a large margin.

AVL Tree-Based Set

For set operations, it may be natural to combine and/or eliminate multiple operations with the same key. However, in some embodiments, these optimizations, when applied for sets, may only have a positive effect when sets are small, such as when the change that multiple threads will perform concurrent operations on the same key is high, according to some embodiments.

Similar to the Insert operation in priority queue, HCF may be used for better concurrency control between the set's operations, according to some embodiments. Additionally, for a balanced tree-based set, the tree structure may be exploited for dictating the assignment of operations to multiple publication arrays, so as to only restrict the parallelism between operations that are more likely to conflict with each other. When utilizing a constant number of publication arrays, each operation may choose the publication array based on the key range stored in the tree and the key of that operation. Thus, in some embodiments, the current key range may be estimated by keeping track of the minimum and maximum keys of any operation applied to the tree.

The example pseudocode below illustrates one embodiment of a choosePubArr function:

```
PubArr choosePubArr(Op) {
    // read the minimum key stored in m__minKey
    // ( update if needed )
    minKey = m__minKey;
    while (Op.key < minKey) {
        if (CAS(&m__minKey, minKey, key)) {
            minKey = key;
            break;
        }
        minKey = m__minKey;
    }
    // read the maximum key stored in m__maxKey
    // ( update if needed )
    maxKey = m__maxKey;
    while (Op.key > maxKey) {
        if (CAS(&m__maxKey, maxKey, key)) {
            maxKey = key;
            break;
        }
        maxKey = m__maxKey;
    }
    // find the corresponding publication array
    // for this key
    index = 0;
```

```
    if (maxKey - minKey > NUM_PUB_ARRAYS) {
        index = floor((Op.key - minKey) /
            ((maxKey - minKey) / NUM_PUB_ARRAYS));
        index = MIN(index, NUM_PUB_ARRAYS - 1);
    }
    return pubArrs[index];
}
```

Note that because the tree is balanced, and since keys are sampled uniformly at random, when two publication arrays are used operations on nodes in the left subtree of the root node are likely to be associated with one publication array and operations on nodes in the right subtree are effectively associated to another array, according to the example embodiment illustrated above. Thus, operations on keys in the right subtree may be unlikely to conflict with operations on keys in the left subtree, making it desirable to allow them to run in parallel with each other. The number of publication arrays may be changed dynamically (e.g., based on the size of the tree), and without any synchronization barriers for existing and/or new operations, in some embodiments. Furthermore, in some embodiments, the association of an operation with a "wrong" publication array (e.g., such as possibly due to a concurrent key range change or a change in the number of arrays), may affect only performance without affecting correctness. For example, an operation associated with a "wrong" publication array may experience unnecessary contention from other operations using the same array).

An alternative approach to support an association of operations on different subtrees with different operation arrays may involve comparing the operation's key to that of the root, according to some embodiments. Such an alternative may be implemented by having the Insert and Remove operations update a look-aside variable that holds the root's key. This key almost never changes, but even when it does, it may only be able to affect performance without affecting the safety of concurrent operations. One example embodiment of this approach divides operations on different subtrees more precisely (e.g., since the root key may not always equal exactly the mean of minimum and maximum keys). However, in some embodiments implementing this approach may require a (trivial) code change of the sequential AVL tree. Additionally, this alternative approach may, in some embodiments, be less flexible to a change in the number of publication arrays.

In some embodiments, increasing the number of publication arrays may be harmful when the tree size is very small. For example, a combiner for one of the arrays may still experience high contention from operations using another array, and thus may end by acquiring the global lock. When the tree size increases, however, the larger number of publication arrays may provide some benefit, according to some embodiments. Additionally, in some embodiments, the positive effect of a larger number of publication arrays may be more evident with larger tree sizes.

As previously noted, a sequential implementation of AVL trees was extended to maintain a copy of the root key in the tree root structure, according to one example embodiment. This change allowed the development of a concurrent version of the tree using HCF and two publication lists, one for operations with the key smaller than the current root key, and another for operations with the key equal or larger than the current root key. Note, however, that unlike the previous example of priority queue, when using an AVL tree both combiners may use the same approach, applying only their own operations in the CombinerHTM and CombinerLock logical phases, according to some embodiments.

Figure 9A:
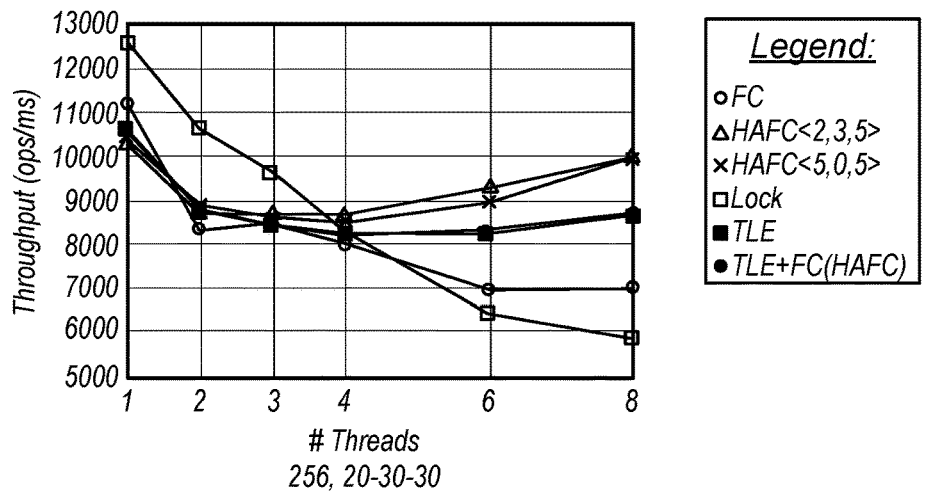
Figure 9B:
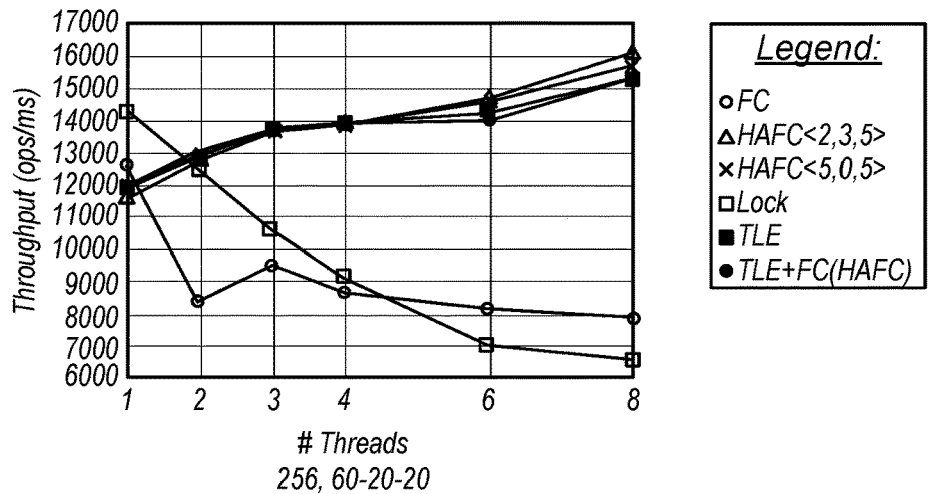
Figure 9C:
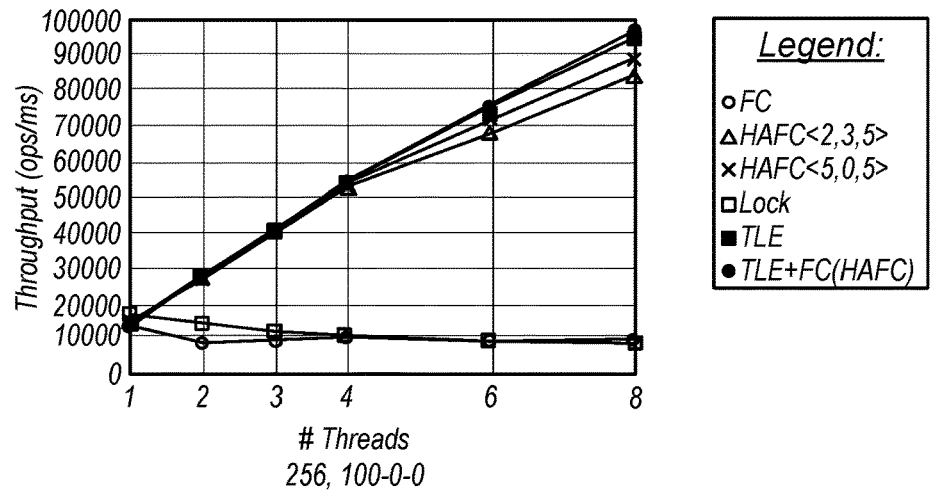

FIGS. 9A-9C show results for experiments with various mixes of operations, according to various example embodiments, as specified in captions. For instance, "256, 20-30-30" means that the experiment was performed with the key range of 256 and the workload consisted of 20% Find, 30% Insert and 30% Remove operations. In each experiment, the tree was initialized with the number of keys equal to half of the key range (256); these keys were chosen uniformly and randomly. Due to inherent scalability of tree operations, results are shown for relatively small trees, where operations manipulating the tree have a higher chance to conflict. In experiments with larger key ranges (and thus larger trees) almost all operations succeed on the every first HTM attempt, producing less interesting results where all HTM+FC variants perform equally well and on par with TLE variants.

Several observations can be made based on the results in FIGS. 9A-9C. First, with a single thread, the Lock variant may provide the best performance for all workloads. This is because the (uncontended) acquisition of a TTS lock is much cheaper than the overhead of starting and committing a hardware transaction.

Second, HCF variants significantly outperform the FC alternative across machines and workloads, according to the example embodiments described herein. Notably, in workloads that involve update operations (e.g., as in FIGS. 9A and 9B), HCF variants beat TLE alternatives as well. This may be the result of multiple publication lists used by HCF which may allow the grouping of threads more efficiently, such as based on their conflict patterns, and may reduce contention on the global lock (in read-only workloads, threads do not conflict). Thus, in workloads that involve update operations, the HCF variants managed to deal better with contention than FC alternatives, according to the example embodiment described herein. This may, in some embodiments, allow HCF to keep scaling all the way or to maintain a maximum throughput. Thus, in situations where TLE may scale negatively or may scale positively up to a relatively small number of threads and may then collapses due to increased contention, HCF may provide better performance than TLE. Thus, not surprisingly, HCF variants scale linearly and perform similarly to TLE variants, according to the example embodiment described herein.

Computing System

Figure 10:
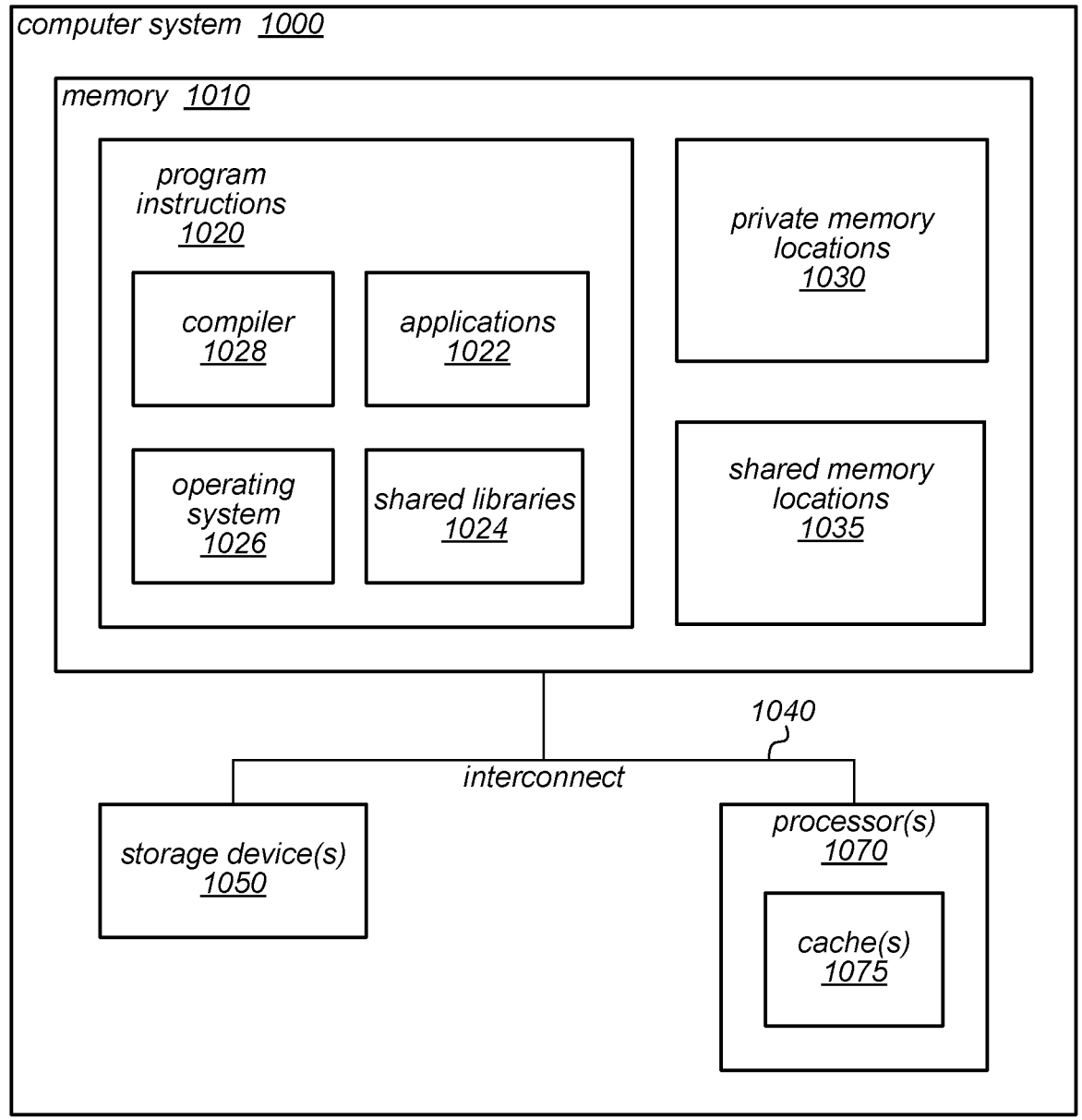
FIG. 10 is a block diagram illustrating one embodiment of a computing system that is configured to implement HCF for synchronizing accesses to concurrent data structures, as described herein.

The techniques and methods described herein for synchronizing accesses to and/or operations on concurrent data structures using flat combing and hardware transactional memory may be implemented on or by any of a variety of computing systems, in different embodiments. For example, FIG. 10 is a block diagram illustrating one embodiment of a computing system that is configured to implement an HCF framework for synchronizing accesses to concurrent data structures, as described herein, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for synchronizing accesses to (and operations on) concurrent data structures, as described herein, may be provided as a computer program product, or software, that may include a non-transitory, computer-readable storage medium having stored thereon instructions, which may be used to program a computer system 1000 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single-threaded or multi-threaded. For example, multiple processor cores may be included in a single processor chip (e.g., a single processor 1070), and multiple processor chips may be included in computer system 1000. Each of the processors 1070 may include a cache or a hierarchy of caches 1075, in various embodiments. For example, each processor chip 1070 may include multiple L1 caches (e.g., one per processor core) and one or more other caches (which may be shared by the processor cores on a single processor). The computer system 1000 may also include one or more storage devices 1050 (e.g. optical storage, magnetic storage, hard drive, tape drive, solid state memory, etc.) and one or more system memories 1010 (e.g., one or more of cache, SRAM, DRAM, RDRAM, EDO RAM, DDR 10 RAM, SDRAM, Rambus RAM, EEPROM, etc.). In some embodiments, one or more of the storage device(s) 1050 may be implemented as a module on a memory bus (e.g., on interconnect 1040) that is similar in form and/or function to a single in-line memory module (SIMM) or to a dual in-line memory module (DIMM). Various embodiments may include fewer or additional components not illustrated in FIG. 10 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement one or more applications 1022 (which may include source code and/or executable code for a multithreaded application that access concurrent data structures), shared libraries 1024, or operating systems 1026. In some embodiments, program instructions 1020 may include a compiler 1028 (which may be an optimizing compiler). In some embodiments, program instructions 1020 may be executable to implement a contention manager (not shown). In some embodiments, program instructions 1020 (or more specifically, shared libraries 1024) may also be configured to implement an HTM-assisted Combining Framework (HCF), which may include methods for synchronizing accesses and/or operation on concurrent data structures, or any other methods that may be invoked by applications 1022.

Program instructions 1020 may be encoded in platform native binary, any interpreted language such as Java™ byte-code, or in any other language such as C/C++, the Java™ programming language, etc., or in any combination thereof. In various embodiments, optimizing compiler 1028, applications 1022, operating system 1026, and/or shared libraries 1024 may each be implemented in any of various programming languages or methods. For example, in one embodiment, optimizing compiler 1028 and operating system 1026 may be based on the Java programming language, while in other embodiments they may be written using the C or C++ programming languages. Similarly, applications 1022 may be written using the Java programming language, C, C++, or another programming language, according to various embodiments. Moreover, in some embodiments, optimizing compiler 1028, applications 1022, operating system 1026, and/shared libraries 1024 may not be implemented using the same programming language. For example, applications 1022 may be C++ based, while optimizing compiler 1028 may be developed using C.

In some embodiments, the program instructions 1020 may include transactional memory support and/or other functions, operations, or procedures for implementing multi-threaded applications that access concurrent data structures, as described herein. Such support and functions may exist in one or more of the shared libraries 1024 (one of which may include a transaction support library), operating systems 1026, or applications 1022, in various embodiments. The system memory 1010 may further comprise private memory locations 1030 and/or shared memory locations 1035 where data may be stored. For example, in some embodiments, shared memory locations 1035 may store data, metadata, or other shared resources (e.g., metadata associated with concurrent data structures, such as stacks, queues, and list-based sets that are operated on using the techniques described herein, or list/queues of pending operations) that are accessible to multiple, concurrently executing threads, processes, or transactions, in various embodiments. In some embodiments, private memory locations 1030 and/or shared memory locations 1035 may store thread-local lists of pending operations, global lists of pending operations (e.g., lists of published operations) and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of operations that support synchronization within multi-threaded applications that access particular concurrent data structures, it should be noted that the techniques and mechanisms disclosed herein for accesses and/or operating on concurrent data structures may be applicable in other contexts in which applications access and/or operate on different types of concurrent data structures than those described in the examples herein and in which different embodiments of the HCF frameworks described herein are supported or implemented. It is intended that the following claims be interpreted to embrace all such variations and modifications.

What is claimed:
1. A method, comprising:
performing, by one or more computing devices:
beginning execution of a multithreaded application that comprises a plurality of operations targeting a concurrent data structure, wherein the concurrent data structure is accessible by a plurality of threads of the multithreaded application to apply the plurality of operations to the concurrent data structure;

attempting, by a given thread of the plurality of threads, execution of a given operation of the plurality of operations using a hardware transaction, wherein said attempting is performed prior to adding a descriptor of the given operation to a set of published operations to be applied to the concurrent data structure;

in response to a failure of said attempted execution of the given operation:

adding, by the given thread, the descriptor of the given operation to the set of published operations;

selecting, by the given thread, a subset of operations whose descriptors are included in the set of published operations to execute, wherein the subset comprises the given operation and one or more other operations of the plurality of operations, wherein a descriptor of at least one of the one or more other operations was added to the set of published operations by a different thread of the plurality of threads; and executing, by the given thread, the selected subset of operations using one or more hardware transactions, wherein said executing comprises applying the selected subset of operations to the concurrent data structure.

2. The method of claim 1, further comprising:
acquiring, by the given thread, a lock associated with the set of published operations, such that the given thread becomes a combiner thread for the set of published operations.

3. The method of claim 1, wherein said attempting comprises repeating said attempting a plurality of times.

4. The method of claim 1, further comprising:
attempting, by the given thread subsequent to said adding, but prior to said selecting and said executing, execution of the given operation using another hardware transaction; and wherein said selecting and said executing are performed in response to a failure of said attempted execution by the given thread using the other hardware transaction.

5. The method of claim 1, further comprising:
adding, by at least one other thread of the plurality of threads prior to selecting, descriptors of the one or more other operations.

6. The method of claim 1, wherein said executing comprises:
combining, by the given thread, two or more of the selected subset of operations, such that the two or more combined operations are applied to the concurrent data structure as a single operation.

7. The method of claim 1, further comprising:
adding, by a second thread of the plurality of threads, a descriptor of a second operation of the plurality of operations to a second set of published operations associated with the concurrent data structure;

acquiring, by the second thread, a second lock associated with the second set of published operations, such that the second thread becomes a combiner thread for the second set of published operations;

selecting, by the second thread, a second subset of operations whose descriptors are included in the second set of published operations to execute, wherein the second subset comprises the second operation and one or more other operations of the plurality of operations; and executing, by the second thread, the second subset of operations using one or more hardware transactions, wherein said executing comprises applying the second subset of operations to the concurrent data structure.

8. The method of claim 1, further comprising:
attempting repeatedly, by another thread, to execute at least one of the selected subset of operations, wherein the another thread added a descriptor for the at least one operation to the set of published operations;

indicating, by the given thread subsequent to said executing the selected subset of operations, for the at least one of the selected subset of operations, a successful execution; and ceasing, by the another thread in response to said indicating, said attempting repeatedly to execute the at least one operation.

9. A non-transitory, computer-readable storage medium storing program instructions that when executed on one or more computers cause the one or more computers to perform:

beginning execution of a multithreaded application that comprises a plurality of operations targeting a concurrent data structure, wherein the concurrent data structure is accessible by a plurality of threads of the multithreaded application to apply the plurality of operations to the concurrent data structure;

attempting, by a given thread of the plurality of threads, execution of a given operation of the plurality of operations using a hardware transaction, wherein said attempting is performed prior to adding a descriptor of the given operation to a set of published operations to be applied to the concurrent data structure;

in response to a failure of said attempted execution of the given operation by the given thread using the hardware transaction:

adding, by the given thread, the descriptor of the given operation to the set of published operations;

selecting, by the given thread, a subset of operations whose descriptors are included in the set of published operations to execute, wherein the subset comprises the given operation and one or more other operations of the plurality of operations, wherein a descriptor of at least one of the one or more other operations was added to the set of published operations by a different thread of the plurality of threads; and attempting, by the given thread, to execute the selected subset of operations using one or more hardware transactions.

10. The non-transitory, computer-readable storage medium of claim 9, wherein the program instructions further cause the one or more computers to perform:

acquiring, by the given thread, a lock associated with the set of published operations, such that the given thread becomes a combiner thread for the set of published operations.

11. The non-transitory, computer-readable storage medium of claim 9, wherein said attempting comprises repeating said attempting execution of the given operation a plurality of times.

12. The non-transitory, computer-readable storage medium of claim 9, wherein the program instructions further cause the one or more computers to perform:

in response to a failure to execute at least one failed operation of the selected subset of operations:

acquiring a lock associated with the concurrent data structure; and applying the at least one failed operation to the concurrent data structure while holding the acquired lock.

13. The non-transitory, computer-readable storage medium of claim 9, wherein said executing comprises at least one of:
   combining, by the given thread, two or more of the selected subset of operations, such that the two or more combined operations are applied to the concurrent data structure as a single operation; or
   eliminating, by the given thread, two or more of the selected subset of operations, wherein the two or more eliminated operations cancel each other.

14. The non-transitory, computer-readable storage medium of claim 9, wherein the program instructions further cause the one or more computers to perform:
   adding, by a second thread of the plurality of threads, a descriptor of a second operation of the plurality of operations to a second set of published operations associated with the concurrent data structure;
   acquiring, by the second thread, a second lock associated with the second set of published operations, such that the second thread becomes a combiner thread for the second set of published operations;
   selecting, by the second thread, a second subset of operations whose descriptors are included in the second set of published operations to execute, wherein the second subset comprises the second operation and one or more other operations of the plurality of operations; and
   executing, by the second thread, the second subset of operations using one or more hardware transactions, wherein said executing comprises applying the second subset of operations to the concurrent data structure.

15. A system, comprising:
   one or more processor cores; and
   a memory coupled to the one or more processor cores;
   wherein the memory comprises:
      program instructions that when executed on the one or more processor cores cause the one or more processor cores to implement a hardware-transactional-memory-assisted flat combining framework, configured to:
         attempt execution of a given operation using a hardware transaction, wherein the given operation is one of a plurality of threads to be applied to the concurrent data structure, wherein said attempt is performed prior to adding a descriptor of the given operation to a set of published operations to be applied to the concurrent data structure;
         in response to a failure of said attempted execution of the given operation:
            add, to the set of published operations associated with the concurrent data structure, the descriptor for the given operation of the plurality of operations;
            select a subset of operations whose descriptors are included in the set of published operations to execute, wherein the subset of operations comprises the given operation and one or more other operations of the plurality of operations; and
            execute the selected subset of operations using one or more hardware transactions, wherein to execute the selected subset of operations, the hardware-transactional-memory-assisted flat combining framework is configured to apply the selected subset of operations to the concurrent data structure.

16. The system of claim 15, wherein the hardware-transactional-memory-assisted flat combining framework is further configured to:
   acquire a lock associated with the set of published operations, wherein the hardware-transactional-memory-assisted flat combining framework acquires the lock in response to an invocation of a function by a thread executing in a multithreaded application executed on the one or more processor cores, wherein in response to the acquisition of the lock, the thread becomes a combiner for the set of published operations.

17. The system of claim 15,
   wherein the hardware-transactional-memory-assisted flat combining framework comprises a plurality of functions configured to select for execution operations whose descriptors are included in the set of published operations;
   wherein the hardware-transactional-memory-assisted flat combining framework is configured to select the subset of operations in response to an invocation of a particular one of the plurality of functions by a thread of a multithreaded application executing on the one or more processor cores; and
   wherein the particular one of the plurality of functions is invoked, based at least in part, on a type of the concurrent data structure, wherein the type indicates an arrangement of data within the concurrent data structure and wherein different ones of the plurality of functions are invoked for different types of concurrent data structures.

18. The system of claim 17, wherein the type indicates that the concurrent data structure is one of a stack, a queue, double-ended queue, a skip list, a binary search tree, a tree-based set, a linked-list, or a priority queue.

* * * * *

UNITED STATES PATENT AND TRADEMARK OFFICE
CERTIFICATE OF CORRECTION

Page 1 of 1

PATENT NO. : 11,029,995 B2
APPLICATION NO. : 15/154686
DATED : June 8, 2021
INVENTOR(S) : Kogan et al.

It is certified that error appears in the above-identified patent and that said Letters Patent is hereby corrected as shown below:

On the Title Page

On page 2, Column 2, item (56) under Other Publications, Line 20, delete "Sym-posium" and insert -- Symposium --, therefor.

In the Drawings

On sheet 4 of 11, in FIG. 4, Line 20, delete ""annouced"" and insert -- "announced" --, therefor.

In the Specification

In Column 7, Lines 13-15, delete "HCF, as described herein may involve the following properties, according to some embodiments:" and insert the same on Column 7, Line 14 as a new paragraph.

In Column 11, Line 66, delete "Combiner HTM" and insert -- CombinerHTM --, therefor.

In Column 13, Line 17, delete ""BeginHelped"" and insert -- "BeingHelped" --, therefor.

In Column 22, Line 13, delete "OwnerPostAnnouce," and insert -- OwnerPostAnnounce, --, therefor.

In Column 22, Line 21, delete "OwnerPostAnnouce" and insert -- OwnerPostAnnounce --, therefor.

In Column 26, Line 4, delete "ac-quiring" and insert -- acquiring --, therefor.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*